(12) United States Patent
Almond et al.

(10) Patent No.: US 8,798,518 B2
(45) Date of Patent: Aug. 5, 2014

(54) METHOD AND SYSTEM FOR CALIBRATING EVIDENCE MODELS

(75) Inventors: Russell G. Almond, Tallahassee, FL (US); Sandip Sinharay, Lawrenceville, NJ (US); Linda Steinberg, Pennington, NJ (US); Robert J. Mislevy, Severna Park, MD (US)

(73) Assignee: Educational Testing Service, Princeton, NJ (US)

(*) Notice: Subject to any disclaimer, the term of this patent is extended or adjusted under 35 U.S.C. 154(b) by 1481 days.

(21) Appl. No.: 11/170,649

(22) Filed: Jun. 29, 2005

(65) Prior Publication Data

US 2006/0003303 A1 Jan. 5, 2006

Related U.S. Application Data

(60) Provisional application No. 60/584,248, filed on Jun. 30, 2004.

(51) Int. Cl.
 *G09B 3/00* (2006.01)
 *G09B 7/00* (2006.01)
 *G09B 1/00* (2006.01)
 *G09B 11/00* (2006.01)

(52) U.S. Cl.
 CPC .. *G09B 7/00* (2013.01); *G09B 3/00* (2013.01); *G09B 1/00* (2013.01); *G09B 11/00* (2013.01)
 USPC .......................................... 434/350; 434/362

(58) Field of Classification Search
 CPC .............. G09B 1/00; G09B 3/00; G09B 7/00; G09B 11/00
 USPC ................................................. 434/350, 362
 See application file for complete search history.

(56) References Cited

U.S. PATENT DOCUMENTS

| 5,059,127 A | 10/1991 | Lewis et al. |
| 6,144,838 A | 11/2000 | Sheehan |

(Continued)

FOREIGN PATENT DOCUMENTS

WO   WO 00/70584   11/2000

OTHER PUBLICATIONS

American Educational Research Association et al. Standards for Educational and Psychological Testing, (1999 Ed.) Washington DC. ISBN:0-935302-25-5, pp. i-iii, 48-85, 118-151, & 170-185.*

(Continued)

*Primary Examiner* — Nikolai A Gishnock
(74) *Attorney, Agent, or Firm* — Jones Day

(57) ABSTRACT

A method and system for estimating uncalibrated task performance are disclosed. The method includes providing a plurality of tasks to one or more examinees, wherein the plurality of tasks comprises a plurality of calibrated tasks and a plurality of uncalibrated tasks, wherein a task model corresponds to each task, wherein each task model comprises parameters relating to characteristics of the corresponding task, wherein each task model for an uncalibrated task further comprises one or more radicals, wherein a student model corresponds to each examinee, wherein each student model comprises one or more variables each relating to one or more of knowledge, skills and abilities of the corresponding examinee and parameters describing a relationship among the one or more variables; receiving a response for each task from each examinee; generating one or more observables for each response; and calibrating one or more student models and each uncalibrated task based on at least the task model corresponding to the task and the observables obtained from the responses.

18 Claims, 12 Drawing Sheets

(56) References Cited

U.S. PATENT DOCUMENTS

| | | | |
|---|---|---|---|
| 6,853,952 B2 | 2/2005 | Chadwick | |
| 2002/0160347 A1 | 10/2002 | Wallace et al. | |
| 2003/0232314 A1* | 12/2003 | Stout et al. | 434/322 |
| 2004/0018480 A1* | 1/2004 | Patz et al. | 434/362 |
| 2004/0076930 A1 | 4/2004 | Steinberg et al. | |
| 2004/0219504 A1* | 11/2004 | Hattie | 434/353 |
| 2005/0221266 A1 | 10/2005 | Mislevy et al. | |

OTHER PUBLICATIONS

Sinharay, S et al. An Application of a Bayesian Hierarchical Model for Item Family Comparison. Educational Testing Service, Princeton NJ (Feb. 2003) [Retrieved Aug. 5, 2008] Retrieved from www.ets.org <http:www.ets.org/research/researcher/RR-03-04.html>.*

Johnson, MS et al. Calibration of Polytomous Item Families Using Bayesian Hierarchical Modeling. Educational Testing Service, Princeton, NJ (Aug. 2003) [Retrieved Aug. 5, 2008] Retrieved from www.ets.org <http:www.ets.org/research/researcher/RR-03-23.html>.*

William Stout et al. On the Use of Collateral Item Response Information to Improve Pretest Item Calibration. LSAC Research Report Series, Law School Admission Council, Newton, PA, Computerized Testing Report, Sep. 2003 <Retrieved form ERIC database, ED 481 721>.*

Russell G. Almond et al., Graphical Models and Computerized Adaptive Testing, Applied Psychological Measurement, vol. 23, No. 3, Sep. 1999, pp. 223-237.

Beland, Anne, Mislevy, Robert; Probability-based Inference in a Domain of Proportional Reasoning Tasks; Journal of Educational Measurement, 33(1); pp. 3-27; 1996.

Mislevy, Robert; What We Can Learn from International Assessments?; Educational Evaluation and Policy Analysis, 17(4); pp. 419-437; 1995.

Mislevy, Robert; Probability-based Inference in Cognitive Analysis; In P. Nichols, S. Chapman, & R. Brennan (Eds.), Cognitively Diagnostic Assessment; Hillsdale, NJ: Erlbaum; pp. 43-71; 1994.

Mislevy, Robert; Almond, Russell, Lukas, Janice; A Brief Introduction to Evidence-centered Design; Educational Testing Service, Research Report RR-03-16; Princeton, NJ; 2003.

Gelman, et al.; Bayesian Data Analysis; London: Chapman & Hall; pp. 141-148; 1995.

Almond, et al.; Using Prototype-Instance Hierarchies to Model Global Dependence; AMS Summer Research Conference on Graphical Markov Models, Influence Diagrams, and Bayesian Belief Networks; Seattle, Washington; 1997.

Almond, et al.; A Multivariate Framework for Educational Testing; Taipei International Statistical Symposium; Aug. 15-17, 1998.

Almond, et al.; Models for Conditional Probability Tables in Educational Assessment; Artificial Intelligence and Statistics 2001; Jaakkola and Richardson (Eds.), Mogan Kaufmann; pp. 137-143; 2001.

Almond, et al.; A Four-Process Model for Assessment Delivery, with Connections to Assessment Design; CSE Report 616, 2002.

Chang, H-H., Ying, Z.; A-Stratified Multistage Computerized Adaptive Testing; Applied Psychological Measurement; vol. 23; pp. 211-223, 1999.

Embretson; Psychometric models for learning and cognitive processess; In N. Frederiksen, R.J. Mislevy and I.I. Bejar (eds.), Test Theory for a New Generation of Tests; pp. 125-150; 1993.

McCullagh, P, Nelder, J.A.; Gereralized Linear Models; 2nd Ed., Chapman and Hall; 1989.

Mislevy; Evidence and Inference in Educational Assessment; Psychometrika; vol. 59; pp. 439-483; 1994.

Mislevy, et al.; Bayes Nets in Eduational Assessment: Where the numbers come from; In Uncertainty in Artificial Intelligence '99; Laskey, K.B. and Prade, H. (eds.), Morgan-Kaufmann; pp. 437-446; 1999.

Mislevy, et al.; A note on knowledge-based model construction in educational assessment, CSE Report 480; University of California, Los Angeles; 1998.

Lauritzen; Graphical Models; Oxford Statistical Science Series; Claredon Press; Oxford, England; 1996.

Sinharay, et al.; An Application of a Bayesian Hierarchical Model for Item Family Calibration; http://research.ets.org/~ssinhary/mixedpaper.pdf; 2002.

Rubin; Bayesianly Justifiable and Relevant Frequency Calculations for the Applied Statistician; Annals of Statistics; 12; pp. 1151-1172; 1984.

Wilkinson, G.N., Rogers, C.E.; Symbolic Description of Factorial Models for Analysis of Variance; Applied Statistics; 22; pp. 392-399; 1973.

Williamson; Utility of Model Criticism Indices for Bayesian Inference Networks in Cognitive Assessment; Ph.D. Dissertation, Dept. of Psychometrics, Fordham Univ.; 2000.

Osterlind; Constructing test items: Multiple-choice, constructed response, performance, and other formats; Journal of Educational Measurements; 36; pp. 267-270; 1999.

Sternberg, R.J., McNamara, T.P.; The representation and processing of information in real-time verbal comprehension; Test Design Developments in Psychology and Psychometrics; Academic Press; pp. 21-43; 1985.

Wiggins, G.P., McTighe, J.; Understanding by Design; Association for Supervision and Curriculum Development; 1998.

Wiggins; Educative Assessment: Designing assessments to inform and improve student performance; Josey-Bass Publishers; 1998.

Wiggins; Assessing student performance; Josey-Bass Publishers; 1993.

Wiley, D.E., Haertel, E.H.; Extended Assessment Tasks: Purposes, definitions, scoring, and accuracy; Implementing Performance Assessment; M. Kane & R. Mitchell (Eds.); Lawrence Erlbaum Assoc.; pp. 61-89; 1996.

Mislevy, et al.; Making sense of data from complex assessments; Applied Measurement in Education; CSE Report 538; 2001.

Mislevy, et al.; Leverage points for improving educational assessment; Evaluating the effects of technology in education; Teachers College Press; 2000.

Cameron, et al.; A cognitive task analysis for dental hygiene; Journal of Dental Education; 64; pp. 333-351; 1999.

Almond, et al.; Transfer of information between systems and evidence models; Artificial Intelligence and Statistics 99; pp. 181-186; 1999.

Mislevy, et al.; A cognitive task analysis, with implications for designing a simulation-based assessment system; Computers and Human Behavior; 15; pp. 335-374; 1999.

Gitomer, D.H., Steinberg, L.S.; Representational issues in assessment design; Ch. in Sigel, I. (Ed.) Development of Mental Representational; pp. 351-370; 1999.

Steinberg, L.S., Gitomer, D.H.; Intelligent tutoring and assessment built on an understanding of a technical problem-solving task; Instructional Science; 24; p. 223-258; 1996.

Gitomer, et al.; Diagnostic assessment of troubleshooting skill in an intelligent tutoring system; Ch. in Nichols, P., et al. (Eds.) Cognitively Diagnostic Assessment; Hillsdale, NJ: Erlbaum; 1995.

Steinberg, L.S., Gitomer, D.H.; Cognitive task analysis and interface design in a technical troubleshooting domain; Knowledge-Based Systems; 6; pp. 249-257; 1993.

Wainer, H., Steinberg, L.S.; Sex differences in performance on the mathematics section of the Scholastic Aptitude Test: Bidirectional Validity Study; Harvard Educational Review; 62; pp. 323-336; 1992.

Mislevy, et al.; On the roles of task model variables in assessment design; Generating Items for Cognitive Tests: Theory and Practice, Irvine & Kyllonen (Eds.); pp. 97-128; 2002.

Almond, et al.; A sample assessment using the four process framework; CSE Report 543; UCLA, Los Angeles; Jun. 2000.

Mislevy, et al.; How to create complex measurement models; Ann. Mtg. of the Nat. Council of Measurements in Education; Apr. 2001.

Mislevy, et al.; Evidence-centered assessment design; Ann. Conf. of the Nat. Center for Research on Evaluation, Standards, Student Testing (CRESST), University of California at Los Angeles, Sep. 9-11, 1998.

(56) References Cited

OTHER PUBLICATIONS

Almond, et al.; A framework for evidence accumulation; White paper; 2002.
Mislevy, et al.; On the Stucture of Educational Assessments; Measurement: Inderdisciplinary Research and Perspectives, 1(1); 3-67; 2002.
Almond, et al.; A Framework for Calibrating Evidence Models; White paper; http://research.ets.org/~ralmond/Statshop/.; 2002.
Almond, et al.; Enhancing the design and delivery of assessment systems: A four-process architecture; Journal of Technology, Learning, and Assessment; 1(5); 2002.
Almond, et al.; A framework for reusing assessment components; New Developments in Psychometrics, Yanai, et al. (Eds.); pp. 281-288; 2003.
Frase, et al.; Technology and assessment; Technology Applications in Assessment: A Learning View, O'Neil & Perez (Eds.); pp. 213-244; 2003.
Mislevy, et al.; Modeling conditional probablilities in complex educational assessments; CSE Report 580, UCLA, Los Angeles; 2002.
Mislevy, R.J., Gitomer, D.H.; The role of probablility-based inference in an intelligent tutoring system; User-Modeling and User-Adapted Interaction; 5; pp. 253-282; 1996.
Mislevy, et al.; Design and analysis in task-based language assessment; Language Assessment; 19; pp. 477-496; 2002.
Steinberg, et al.; Introduction to the Biomass project: An illustration of evidence-centered assessment design and delivery capability; CSE Report 609; UCLA, Los Angeles; 2003.
Williamson, et al.; An ECD approach to designing for reusability in innovative assessment; Presented at Ann. Mtg. of American Educ. Research Assoc.; Chicago, IL; Apr. 2003.
Williamson, et al.; Creating a complex measurement model using evidence-centered design; Presented at Annual Meeting of National Council on Measurement in Education; Chicago, IL; Apr. 2003.
Mislevy, et al.; Psychometric principles in student assessment; International Handbook of Educational Evaluation; 2001.
Williamson, et al.; Model criticism of Bayesian networks with latent variables; Uncertainty in Artificial Intelligence; 16; pp. 634-643; 2000.
Reckase, Mark D., The Difficulty of Test Items That Measure More Than One Ability, presented at the 69th Annual Meeting of the American Educational Research Association, Chicago, IL, Mar. 31-Apr. 4, 1985.

\* cited by examiner

FIG. 2A   DATA USED IN CALIBRATION

FIG. 2B

STEP 1: ECD REPOSITORY (PORTAL) COMMUNICATES TASK MODEL INFORMATION TO TCS/TCA.

STEP 2A: TASKS ARE SELECTED FOR THE PRETEST AND SENT TO PRETEST PACKAGING.

STEP 2B: PACKAGED DATA IS SENT TO THE DELIVERY SYSTEM AND THROUGH THAT TO THE PARTICIPANT.

STEP 2C: THE PARTICIPANT GENERATES RESULTS WHICH ARE SENT TO CRDS.

STEP 3A: ASSESSMENT MODEL INFORMATION (STUDENT AND EVIDENCE MODEL DATA) IS SENT FROM THE ECD REPOSITORY (PORTAL) TO THE CALIBRATOR. AT THE SAME TIME, TECS/TCA SENDS A TASK DESCRIPTION (DENOTING WHAT TASK SPECS BELONG TO WHICH TASKS, WHAT THE VALUES OF THE TASK MODEL VARIABLES ARE, ETC.) TO THE CALIBRATOR.

STEP 3B: CRDS SENDS PRE-CALIBRATION RESULTS TO THE CALIBRATOR. DATA INCLUDES INFORMATION SUCH AS WHICH PARTICIPANT TOOK WHICH TASK AND WHAT THEIR OBSERVABLES WERE IN THE TASK.

STEP 3C: THE CALIBRATOR SENDS AN ASSESSMENT DESCRIPTION DETAILING THE SPECIFIC NUMBERS TO BE USED TO THE SKM.

STEP 3D: THE CALIBRATOR SENDS POST-CALIBRATION RESULTS TO THE CRDS CONTAINING BOTH PRE-CALIBRATION INFORMATION AND ASSESSMENT LEVEL SCORES.

STEP 4A: PACKAGING DRAWS INFORMATION FROM BOTH SKM AND TCS/TCA AND COMBINES THE DATA INTO A PACKAGE.

STEP 4B: THE PACKAGED ASSESSMENT DESCRIPTION IS SENT TO THE DELIVERY SYSTEM WHERE IT CAN BE USED OPERATIONALLY.

METHOD AND SYSTEM FOR CALIBRATING EVIDENCE MODELS

BACKGROUND

Traditional test calibration methods are limited by the amount of information sharing that takes place between task authors and psychometricians. Typically, psychometricians have access to very little data regarding the authoring of the tasks and provide very little feedback to the authors about which tasks are most effective.

When an educational assessment is given in multiple forms—when different examinees receive different patterns of tasks, but the scores for each set of tasks are expected to be comparable—a mechanism for equating those scores is required. Conventional assessment techniques calibrate the statistical model used to score each task so that all tasks are scaled to a common set of dimensions. Although expert opinions used in determining calibration weights often closely approximate relative difficulty, pretesting the tasks is an essential aid to discovering how difficult the tasks are in practice. Pretesting not only corrects inaccurate expert estimates, but also reveals surprising tasks that do not align with the statistical model.

Four sources of information are typically available when calibrating tasks: (i) expert opinions as to a task's difficulty and the extent to which the task draws on various knowledge, skills and abilities of an examinee; (ii) pretest data from pretesters exposed to the task; (iii) the similarity of the task to other tasks with known or partially known parameters; and (iv) features of the task which are known to affect difficulty (known as radicals). While pretest data comes only from field testing of a task, the other three sources of information can be gathered from the assessment design process.

Calibration is also important in checking a theoretical measurement model. For example, it may be discovered that a particular task does not perform as expected during calibration. The task may be harder, easier, have a different evidentiary focus (i.e., test a different set of skills), or have undesirable characteristics, such as being non-monotonic in one or more skills or having markedly different evidential properties for different sub-populations. Traditional testing procedures used pretesting to expose such tasks. However, the procedures do not analyze the characteristics of such tasks to improve future task design.

What is needed is a method of using previously authored tasks to determine the likely performance of future-designed tasks.

A further need exists for a method of calibrating differing sets of tasks to a common score range.

A further need exists for a method of assessing a difficulty of a particular task across sub-populations to determine a fairness level for the task or to determine a difficulty level for each sub-population.

A further need exists for a method of improving the design of future tasks based on information contained in current tasks.

The present invention is directed towards solving one or more of the problems listed above.

SUMMARY

Before the present methods, systems, and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to a "parameter" is a reference to one or more parameters and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a method of constructing an assessment includes documenting expert opinions regarding tasks, evidence and the relationships between such evidence and tasks so that information can be incorporated into assessment construction and calibration of a measurement model. The model is calibrated by coordinating task authorship and psychometric evaluation to produce an evidence model. The calibration process permits assessment designers to verify modeling assumptions and determine whether tasks or task families have undesirable characteristics. Moreover, the calibration process refines the parameters of the measurement model to make the assessment more reliable and accurate. In addition, the calibration process permits accurate scoring for examinees that take the assessment.

In an embodiment, three types of data are used to calibrate an assessment: (i) information pertaining to student models (which proficiencies is the assessment designed to test?) and evidence models (what constitutes evidence that the measured proficiencies are or are not present in a given examinee?); (ii) information pertaining to tasks, including specifications and task models; and (iii) pretest results including information regarding the skill sets of pretesters and the scored responses for each pretester taking the task. The calibration process returns a link model for each task based on the above-listed data. The evidence model is typically embodied, at least in part, by a mathematical model with adjustable parameters. The link model is a version of an evidence model with the parameters for the model adjusted for a specific task.

In an embodiment, a Markov Chain Monte Carlo algorithm may be used to fit a Bayesian model to perform the calibration process. The Markov Chain Monte Carlo algorithm draws values for unknown parameters and variables from the posterior distribution of a Bayesian model and converges to a correct answer for each parameter. In an embodiment, a Gibbs sampling may be used to draw the values. In an alternate embodiment, the values may be drawn using a Metropolis-Hastings algorithm.

BRIEF DESCRIPTION OF THE DRAWINGS

The accompanying drawings, which are incorporated in and form a part of the specification, illustrate embodiments of the present invention and, together with the description serve to explain the principles of the invention. The embodiments illustrated in the drawings should not be read to constitute limiting requirements, but instead are intended to assist the reader in understanding the invention.

DETAILED DESCRIPTION

Evidence Centered Design

Figure 1:
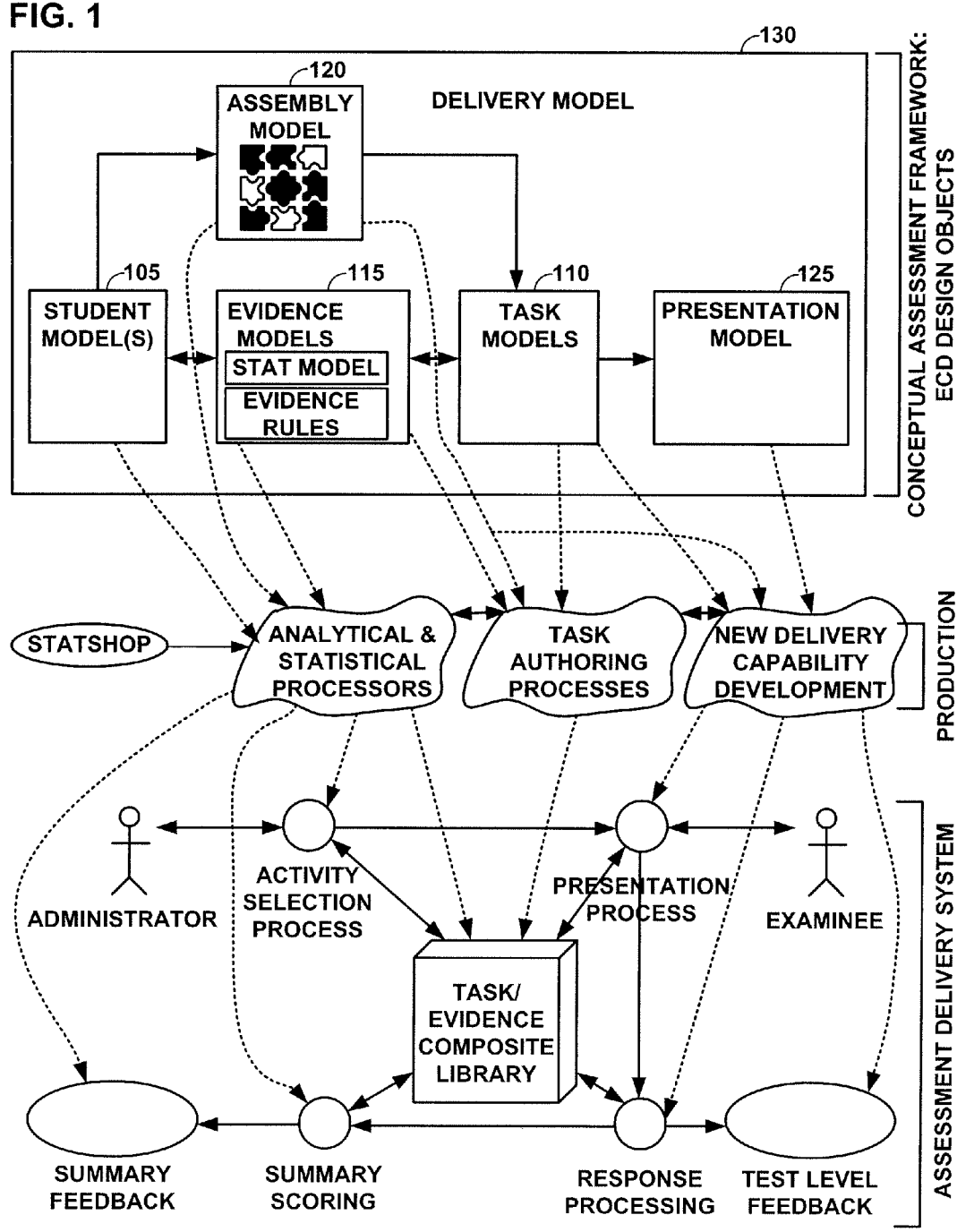
FIG. 1 depicts an exemplary framework for the formal design of an educational assessment according to an embodiment.

Evidence Centered Design (ECD) may provide a central repository of objects which provide views of the design decisions to all stakeholders in the design and construction of an assessment. Two key advantages may result when constructing measurement models. First, the ECD tools may provide a mechanism for capturing and documenting an expert's prior opinion about the structure and strength of evidentiary relationships so that information may be incorporated into the construction and calibration of the measurement model. Second, ECD may provide a mechanism for coordinating the work of test developers in authoring tasks, and psychometricians in calibrating an evidence model.

The calibration of a measurement model to pretest data may assist in the production of an assessment product. Calibration may permit verification of the modeling assumptions made by the experts. For example, it may spot tasks and task families that display undesirable characteristics such as ambiguities or variations in difficulty across different subpopulations that are unrelated to the construct of interest. Moreover, calibration may permit refinement of the parameters of the measurement model (i.e., the weights of evidence) to improve the accuracy and reliability of the assessment over that achievable by expert opinion alone. Calibration may further enable the correlation between different forms of assessment. Furthermore, calibration may be used to assign scores, such as statistics of student model variables, to examinees as a side effect of the calibration process.

The present invention may include a library of statistical code that calibrates assessments designed using ECD. The library may receive, for example, three different data types as inputs: (i) information from an ECD repository regarding student models and evidence models that contain explicit information about the measurement model for the assessment; (ii) information about authored tasks, including their relationship to task specifications and task models; and (iii) pretest results containing information about the pretest examinees which attempted each task and the observations or scored responses from each examinee. Link models, versions of the evidence models with the weights of evidence adjusted for a specific task, may be retrieved from the library for a set of tasks. The link models may be used to operationally score the assessment. The library may use an open implementation protocol that supports many different measurement paradigms including, without limitation, item response theory (IRT) and multivariate discrete Bayesian networks.

Markov Chain Monte Carlo (MCMC) is a method for fitting full Bayesian models that iteratively draw values for unknown parameters and variables from their joint distribution. The MCMC process may eventually converge to a joint posterior distribution for all parameters from which final values for the parameters may be chosen.

In an embodiment, data provided by other ECD processes may be used to produce a full Bayesian measurement model. One or more tasks may supply information required by a task model, such as values for task model variables. Pretest forms may be assembled in accordance with constraints supplied by an assembly model. Given tasks and pretest forms in these formats, the size of the pre-testing sample may be reduced by exploiting knowledge in the task model variables and the hierarchy of tasks. Accordingly, a potential savings in the pretest sample size over current practice may be achieved.

In an embodiment, an examinee's performance may be observed to provide evidence that the examinee has or does not have the knowledge, skill and abilities required for a particular task. In an embodiment, situations may be generated to make observations regarding the examinee's knowledge, skill and abilities in relation to particular tasks.

FIG. 1 depicts an exemplary framework for the formal design of an educational assessment according to an embodiment. The Student Models 105 may describe the dimensions of knowledge, skills and abilities that the assessment measures and statistics regarding the examinee's performance used to make claims about a particular examinee. The Task Models 110 may describe the kinds of tasks used to assess those knowledge, skills and abilities. The Task Models 110 may specify the types of material presented to the examinee and the type of work product returned. The Evidence Models 115 may describe how to make key observations about the examinee's work product. The Assembly Model 120 may describe the mix of tasks used to create an assessment with the corresponding Evidence Models 115 and Student Models 105. The Presentation Model 125 and the Delivery Model 130 may describe the environment in which individual and overall tasks are performed.

Knowledge and data used in calibration may be organized in the framework for an assessment. The framework may be stored in an ECD repository. Knowledge inherent in the assessment design objects may guide the development of other processes that access objects providing framework design specifications.

Figure 2:
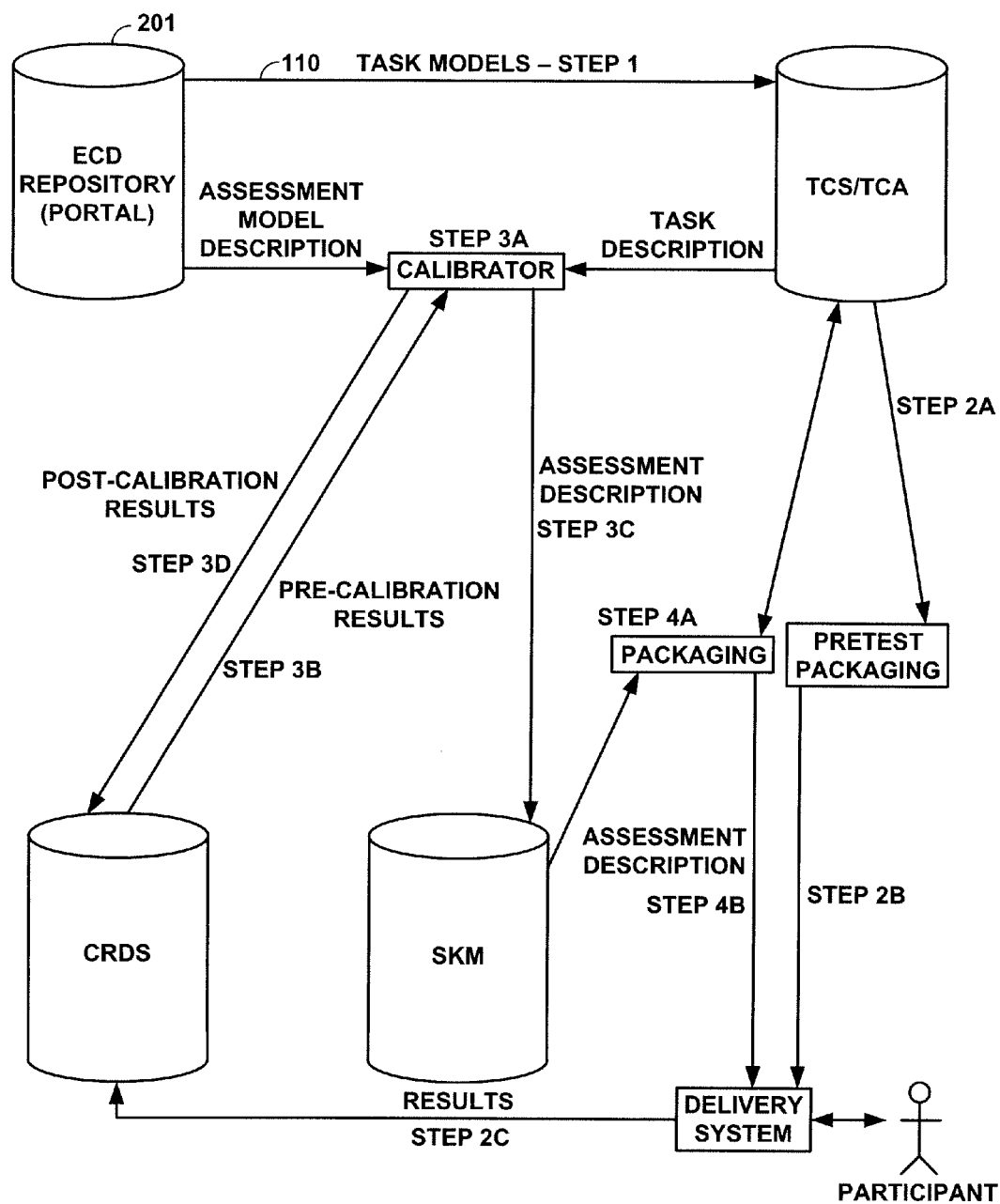
FIG. 2 depicts an exemplary data flow process for the calibration of the framework according to an embodiment.

FIG. 2 depicts the data flow for the calibration portion of the process. Task Models 110 from the ECD repository 201 may be used to guide the authoring of tasks. Task specifications, which restrict the Task Models 110 by constraining features, may also be used to assist the authoring or automatic task generation process. The Task Models 110 may provide specifications for the tasks to be authored and may denote which Task Model 110 variables are radicals (i.e., contain information related to difficulty for use in calibration).

The newly authored tasks may then be pretested. The pretest may capture observations (i.e., scored responses) from each pretest examinee interacting with the task. Demographic information pertaining to the examinee and, optionally, examinee performance on previously calibrated tasks may also be recorded.

The calibration process may then incorporate data from a number of different sources to assist in calibrating the task. First, the process may examine knowledge regarding Student Models 105, an Evidence Model 115, prior distributions for the parameters of the two Models and the association between the Task Model 110 and the Evidence Model 115 from the ECD repository 201. The ECD repository 201 may also include links to previously constructed tasks. In addition, Task Model 110 data, such as the tasks associated with particular Task Models 110 and task specifications, and the values of radicals for each task may be incorporated into the calibration process. Moreover, pretest data regarding the examinees that performed each task, the values of the observables for each task, and the value of any demographic variables pertaining to an examinee may be used.

The calibration process may produce posterior distributions for all Link Model, Link Model Prior, Evidence Model 115, and Student Model 105 parameters. These parameters may be exported as calibrated Link Models for the pretest tasks and may be saved for use as refined models for subsequent iterations of the calibration process. The calibration process may further produce posterior distributions for all Student Model 105 variables. Examinee scores may also be generated via the calibration process, as may measures of how well the model fits the pretest data.

Figure 3:
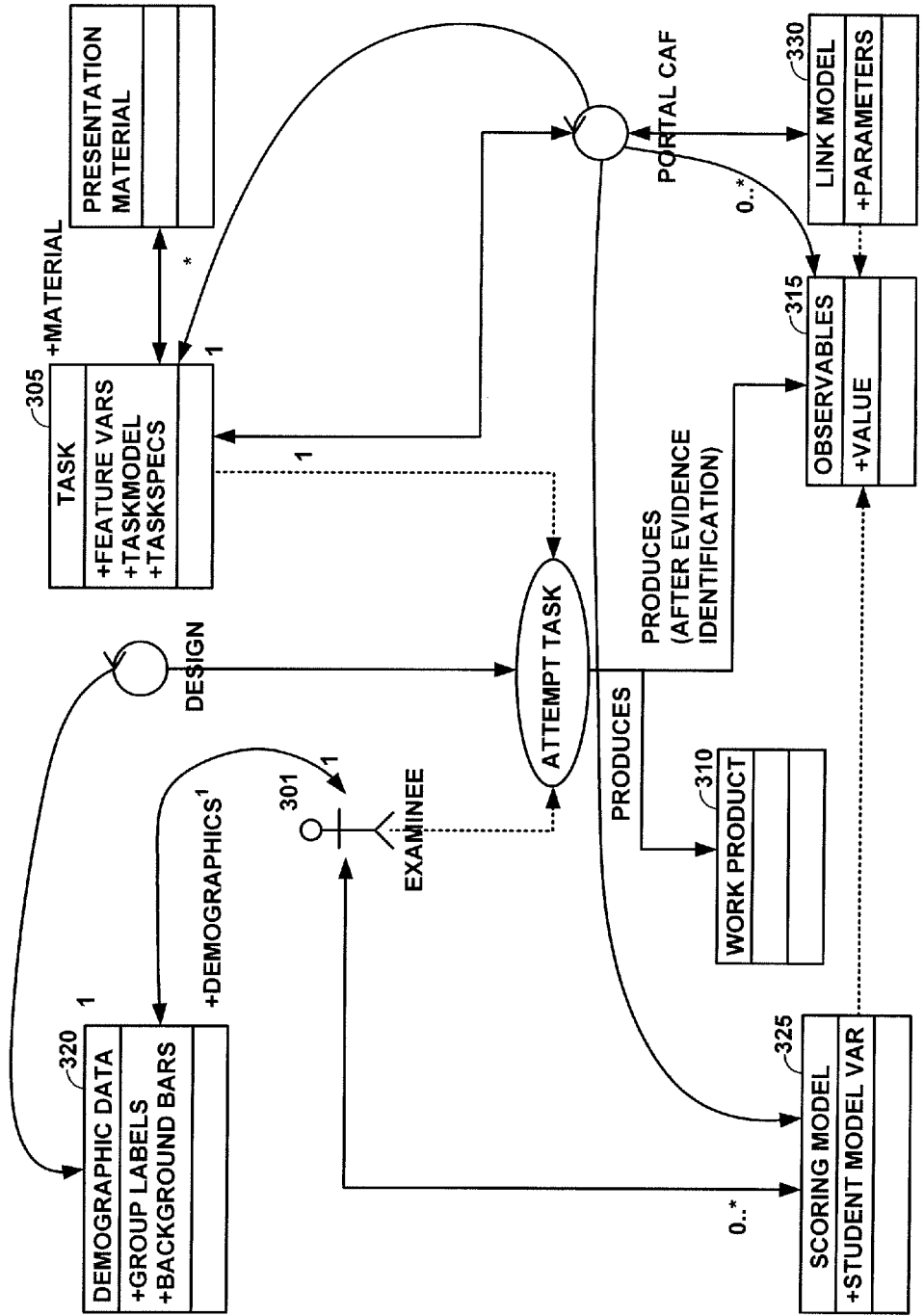
FIG. 3 depicts exemplary types of data used in calibrating an assessment test according to an embodiment.

FIG. 3 depicts exemplary types of data used in calibrating an assessment test according to an embodiment of the present invention. The principal objects used in calibrating a test may be examinees 301—people who take the test—and tasks 305—problems that assess the examinees' abilities in some construct of interest. In a pretest environment, each examinee may not receive all tasks. The scheme determining which examinee receives which task(s) is called the design of the pretest.

When an examinee interacts with a task, the examinee may generate work product 310 or a "raw" response. The response processing or evidence identification phase may produce key outcomes or observables 315. For example, in a multiple choice item, the response may be the selected option, and the observable may be a Boolean variable denoting whether or not the correct response was selected. In an essay item, the response is an essay, and the observables are the ratings assigned by one or more graders. Preferably, raw responses may not be used during the calibration process once the observables have been calculated. Observables may have well-defined data types. A predetermined number of observables may be assigned to each task.

The examinees for a pretest may be representative of a population of interest. Two kinds of data may be associated with each examinee: (i) demographic information 320, which may be gathered from a questionnaire and may include, for example, gender, race, age, years of schooling, parental education, teacher background and/or other information of interest; and (ii) a scoring model 325, which describes information regarding the examinee's proficiency in the knowledge, skills and abilities sought to be measured. The demographic information 320 may be used to define sub-populations, particularly when studying fairness issues. If the parameters of the Link Models 330 have a substantial dependence on demographic variables, the calibration may determine that the task is unfair. The proficiencies of the scoring model may be characterized by the Student Model 105 variables. The purpose and domain of the assessment may determine the number and nature of these variables. In the case of a placement or selection test, a single variable may suffice. In the case of diagnostic assessment, more complex multivariate models may be generated.

If the values of the Student Model 105 variables are known, predictions regarding how an examinee would perform on a given task may be accurately formed by using a Link Model 330. Typically, the Link Model 330 may have a fixed form for a given class of tasks, but its parameters may have specific values for each task. A task for which Link Model 330 parameters are known or thought to be known is "calibrated." While the Link Model 330 parameters are not directly observable, the calibration process may estimate the parameters from the data. Many pretest designs may include a mixture of previously calibrated tasks and uncalibrated tasks. The calibrated tasks may provide a reference point for calibrating the uncalibrated tasks.

In Bayesian statistics, little practical difference exists between random variables and parameters of a model. Rather, Bayesians may distinguish between known quantities, which are fixed at their known values, and unknown quantities, which are considered random variables. In the ECD calibration context, however, the terms "variable" and "parameter" are distinct. A variable's value may only be known or knowable when a particular examinee is taking the assessment. In contrast, a parameter's value may be relevant across all examinees.

Estimating the Link Model 330 parameters and the Student Model 105 variables simultaneously may be difficult. Accordingly, an embodiment may alternate between treating the Student Model 105 variables as fixed and estimating the Link Model 330 parameters, and treating the parameters as fixed and estimating the variables. Each of the EM algorithm and the Markov Chain Monte Carlo procedure described below may depend on this principle.

The calibration process may serve one or more purposes including, without limitation, calibrating tasks, model checking, determining fairness, performing educational research and assigning scores. Calibrating tasks may include estimating Link Model 330 parameter values (for tasks that are currently uncalibrated). Model checking may include verifying the accuracy of posited models (score models and Link Models 330) as compared to actual responses. Determining fairness may include determining if Link Model 330 parameters are approximately equal across different sub-populations and if the models fit equally well for different sub-populations. Performing educational research may include determining the impact of demographic variables on the Student Model 105 variables. Finally, assigning scores to examinees may include determining a rating to assign to each examines based on the calibration of the tasks. While assigning scores is not a direct purpose of the calibration process in and of itself, the evidence accumulated in the Student Model 105 variables may be summarized to provide appropriate statistics for determining scores. The calibration process may also provide an opportunity for quality control and mistake correction, whereas automatically assigning a score based on previously determined values of variables and parameters may not provide such an opportunity.

In an embodiment, the ECD process may result in a set of design objects (models) from which an assessment may be produced. Such models may govern the authoring and calibration of tasks, the construction of a delivery system, the administration of an assessment, and the validation of results. The model described below may permit the design of future assessments and the ordering of previously existing assessments designed under different methodologies.

Tasks

Tasks, as performed by examinees or others who engage in an assessment, may be designed to produce evidence needed to support the assessment's claims. A task may include a range of questions of different complexity from a single discrete task, which elicits a simple response (such as a selection) yielding a single independent observation, to a collection of complex subtasks, which each elicit complex responses and yield multiple conditionally dependent observations. A task may include a "testlet" in which multiple discrete items and their responses yield a set of conditionally dependent observations. A testlet may include common stimulus material. A task may request, for example, a constructed or a multiple choice response. The task may be presented via computer, on paper or in any other form. Task design may include considering how to structure content and/or how to accommodate that structure within the constraints of a particular assessment, and understanding the claims (inferences) that a particular assessment will make, the evidence required to support those claims, and/or the development of corresponding assessment design elements. The final product of the task design may be a set of specifications used to author or implement one or more tasks that serve as requirements for assessment delivery processes. Task design may yield specifications related to the presentation process and may be consistent with specifications for response processing or summary scoring processes as described by associated Evidence Models 115.

Task design may also yield a collection of robust hierarchical design elements that may be re-used to produce new task design elements. Task design elements may be consistent with requirements for qualitative and quantitative evidence as expressed in related Evidence Models 115. A task design element at any hierarchical level may be calibrated with an Evidence Model 115 at an analogous level.

Figure 4:
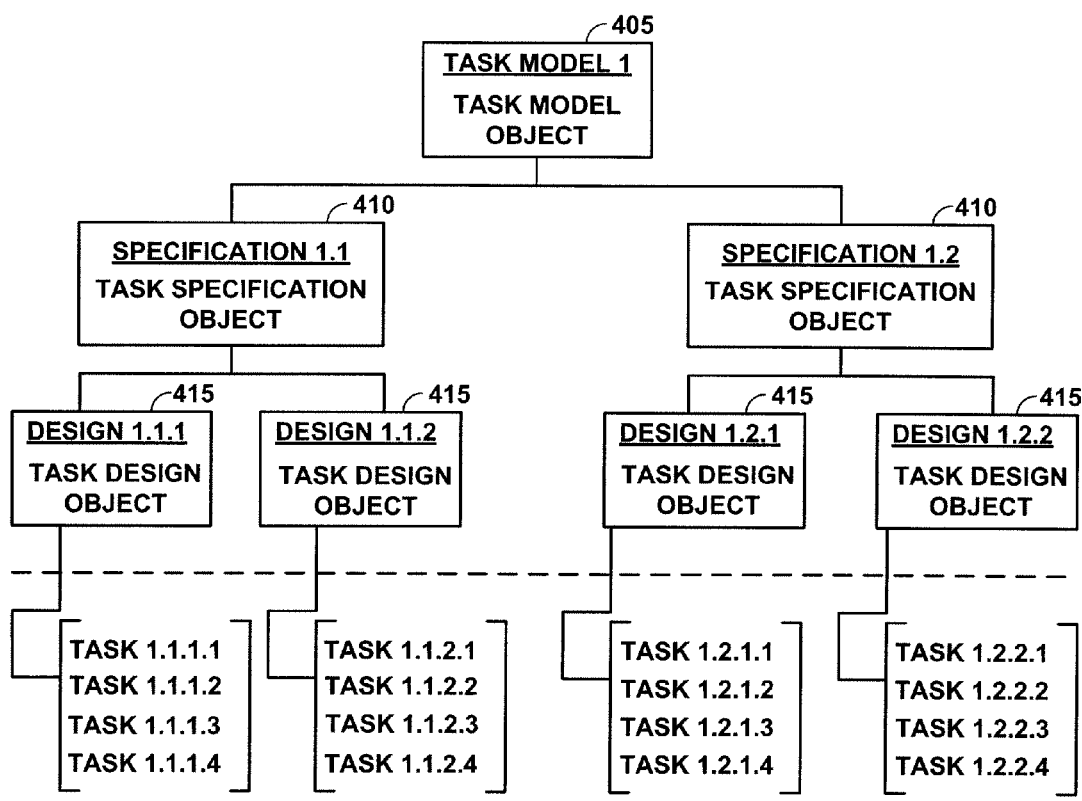
FIG. 4 depicts an exemplary task design element hierarchy according to an embodiment.

A task design element hierarchy may include, for example, three types of objects: Task Models 110, task specifications, and task designs. Each type of object may include task design information. Preferably, the type of information represented by each of these three object types may not substantially vary. However, task specifications and task designs may additionally permit information to be restricted or fixed. In other words, a Task Model 110 may represent a particular potential universe, while task specifications and task designs may represent increasing restrictions on that universe. From top to bottom, a hierarchy of these design elements may be created by a systematic and incremental increase in the restrictions applied to the Task Model 110. Thus, design elements at the top of the hierarchy may be less fully specified (i.e., less restricted) than those at the bottom of the hierarchy. Restrictions set in design elements at higher levels of the task design element hierarchy may be inherited by design elements at lower levels of the hierarchy. FIG. 4 provides an exemplary task design element hierarchy according to an embodiment.

A Task Model 405 may be the highest level task design element, and its properties may be used to describe the content and format of tasks generated from it. Each Task Model 405 may contain a collection of presentation material specifications, a collection of work product specifications and a collection of Task Model 405 variables. Presentation material specifications may include any material presented to the examinee in the form of instructions, stimuli and/or prompts. Work product specifications may describe how examinee responses are captured. Task Model 405 variables may (i) constitute the primary means of describing characteristics of differing types of presentation material and the interaction between the material; (ii) describe conditions in the task content, the task format or the task environment that determine which Evidence Model(s) 115 may be used for scoring; (iii) describe task content characteristics that control task difficulty (known as "radicals"); (iv) control aspects of the presentation process, such as font size or simulator state; and (v) describe task content characteristics used to determine selection and sequencing of tasks. A particular Task Model 405 variable may perform one or more of these functions and may include a plurality of possible values. Task Model 405 variables may only be set within the Task Model 405 or related task specifications, task designs or tasks. The Task Model 405 may be linked to an Evidence Model 115 calibrated to reflect the average of a range of difficulties for tasks involving specified radicals.

Each task specification object 410 may be a child of a Task Model 405 in the task hierarchy and may incorporate the presentation material specifications, work product specifications and Task Model 405 variables from it. One or more, but not all, Task Model 405 variables that control task difficulty (i.e., a radical) may be fixed or restricted by the task specification object 410. Selecting a value for a radical may determine the difficulty of the generated task and may limit the range of tasks available to the task specification object 410. A task hierarchy may include one or more levels of task specification objects where each level may represent an increasing number of fixed radical values. Each level of task specification objects may be associated with a calibrated Evidence Model 115. A task specification object may also have the values of one or more non-radical (i.e., incidental) task model variables fixed. Incidental variables may not affect the link between a task specification and an Evidence Model 115.

Task design objects 415 may be the lowest level in the task hierarchy. All radicals may have fixed values in a task design object 415. Task design objects 415 may be linked to Evidence Models 115 at the lowest level of their corresponding hierarchy. Multiple levels of task design objects 415 may be formed by fixing incidental variables in successive levels. The task design may represent the full set of task specifications to be implemented. Even if all Task Model 405 variable values are fixed, a task design object 415 may still be associated with a plurality of tasks.

Student Models and Score Models

An assessment design may also provide a specification of how the responses captured from the examinee's performance on the task are used to provide evidence about the knowledge, skill and abilities of interest. In ECD, the Student Model 105 may provide a measurement model for the knowledge, skills and abilities of interest and how they are related to the claims that are made.

A Student Model 105 may be a collection of variables representing knowledge, skills and abilities in the domain of interest and a description of their relationships. Relationships may be substantive (e.g., Skill A is a prerequisite for Skill B), population co-occurrent (e.g., most examinees who have Skill A also have Skill B) or information-dependent (e.g., because the examinee was unable to perform Task 1, the examinee lacks either Skill A or Skill B). The Student Model 105 may have the ability to represent these dependency types among variables.

A Student Model 105 may describe an entire population of examinees and, in particular, the expected knowledge base for an examinee prior to the examinee taking the assessment. The expected knowledge base for an examinee may be based on the assessment that is being performed. For example, in the case of a college entrance exam, the examinee may be assumed to have the knowledge base of a college-bound high school senior. However, as specific evidence (in the form of observations from performances on tasks) is received, the beliefs about a particular examinee may drift from the population averages. The examinee-specific version of the Student Model 105 is called a score model.

A score model may be generated for each examinee. As such, a natural hierarchical structure may exist for a Student Model 105 where the sub-levels are examinees. More complex hierarchies may be generated including, for example, different Student Models 105 for sub-populations within the overall population. A more complex hierarchy may permit investigation of the effect of differential educational opportunity on different knowledge, skills or abilities of interest.

Claims relevant to the assessment may be supported with statistics from score models. A simple claim may correspond to an expected value of one of the Student Model 105 variables. A complex claim may correspond to a predicted outcome on a collection of tasks. During the calibration process, the Student Model 105 variables may be monitored to assess their accuracy.

Probability models may be used to represent states of knowledge. Thus, each score model may include probability distributions over the knowledge, skill and ability variables. Various statistics from such distributions may represent claims. Student Models 105 may be "prior" distributions (for the population) and a score model may be a "posterior" distribution for a particular examinee. If an assessment has been running for a long time, the prior distribution may be well calibrated. Otherwise, the Student Models 105 and the Link Models (discussed below) may require calibration.

Evidence Models and Link Models

An Evidence Model 115 may include a statistical model that describes expectations for observables from tasks. The statistical model may provide a prediction for the observables from a task based on one or more of the Student Model 105 variables. Thus, the Evidence Model 115 may provide two kinds of information about the linkage between the observables and the Student Model 105 variables: (i) structural information (which skill variables are related to which observations) and (ii) functional form (what is the nature of this relationship). The functional form may be typically expressed by a parametric family distribution. The parameters of this distribution are called the weights of evidence. The weights of evidence, such as task difficulty, may vary from task to task in a Task Model 110. A task specific version of the Evidence Model 115 incorporating particular parameter values is called a Link Model. Evidence Models 115 and Link Models may form a hierarchical structure similar to those described above. Evidence Models 115 may additionally provide information regarding which Task Model 110 variables are radicals (i.e., predict weight of evidence parameters such as task difficulty).

In the case of univariate IRT, the structural part of the Evidence Model 115 may be trivial since the single observation is either relevant to the construct of interest in the Student Model 105 or not. The functional form of the Evidence Model 115 may be the parametric form of the likelihood for the observation. Thus, the Link Models may merely include the item parameters.

In the case of a discrete Bayesian network, the structural part of the Evidence Model 115 may be a graph linking the Student Model 105 variables to the observations for which they are believed to be relevant. Conditional probability tables may describe the probability for each configuration of observables given the configuration of relevant Student Model 105 variables. However, the values contained in the tables may vary from task to task. The Link Models may be used to assign values for the probability tables.

Since Task Models 110 typically encompass a variety of potential tasks, the Link Model parameters (weights of evidence) may vary considerably for Link Models corresponding to the same Task Model 110. However, if the tasks all come from a tightly constrained task specification object, the parameters for the Link Models may be much closer in value. Close parameters may be used to reduce the pretest sample sizes.

Capturing this relationship may be performed in at least two ways. First, a hierarchy of Link Model Priors may be constructed to mirror the task specification hierarchy. Each Evidence Model 115 may contain prior distributions for all of the parameters based on an expert's opinions about the evidence provided from the task. The Link Model Prior may be identical to its parent Evidence Model 115 except that the prior distributions for the parameters may be tightened to reflect the restriction of radical Task Model 110 variables within the task specification. In the extreme case, the variability of the parameters may be small enough to be within the acceptable margin of error of a scoring engine. This may be particularly important with tasks that are automatically generated. In the extreme case, the calibrated Link Model Prior for the task design may be used in place of the Link Model for the task with little loss of reliability. Accordingly, only task designs, and not individual tasks, may be calibrated. On the other hand, if no task specifications are used, hierarchical modeling may provide little advantage for pretesting.

The other method may use radical task model variables in a generalized regression. In this case, the prior distribution of the parameters may be expressed as a linear model which includes the values of some of the Task Model 110 variables. If the residual variance is small enough to be ignored during the scoring process, a calibrated regression model may not be recalibrated in the future.

The two methods may not be performed simultaneously. If the same radical variables are used in both the construction of the task specification hierarchy and as the "radicals" in the regression model, aliasing may occur. In other words, no data may exist that would allow selection between the hierarchy effect of the task specifications and the regression effect of the Task Model 110 variables. Furthermore, if a Task Model 110 only includes a few tasks, several radical variables may still be aliased or effectively aliased. Aliasing may require that less than all information be used in calibrating the model.

Bayesian Psychometrics

A fundamental principle of Bayesian statistics is that probability distributions may be used to represent states of knowledge about unknown quantities. Accordingly, in an embodiment, proficiency model variables in the score model for an examinee may not be directly observable. However, inferences regarding the proficiency model variables based on observations and data regarding similar examinees may be made. The observations and experiential data may form the basis for a distribution representing the state of knowledge about an examinee.

One method of using observations and experiential data to form a distribution is item response theory. A unidimensional IRT process may use a single latent proficiency variable, $\theta$, representing the ability to perform well on test items from the domain of interest. The process may express experiential data about $\theta$ prior to observing any item responses as a "prior" probability distribution, $p(\theta)$. The Student Model 105, which in this case may be a simple model possessing the single latent proficiency variable, may include the prior probability distribution.

The estimate of the examinee's ability, $\theta$, may be determined by administering a series of dichotomously scored items (1 for a correct response and 0 for an incorrect response) with known item parameters. The observables for each item may be considered independently of the observables for other items based on θ. The Link Model may express the relationship between the latent student model variables and the observable for item $x_j$, which may be a predictive probability distribution conditioned on the latent proficiency variable, θ, and item parameters, by (characteristics of the tasks, such as task difficulty and the tendency of a task to discriminate among examinees at different ability levels). The probability distribution is called a "likelihood." Several parametric forms may be used for the likelihood. For example, the one parameter logistic model ("1PL") is expressed in Eqn. 1. Two parameter logistic ("2PL") or three parameter logistic ("3PL") functions may also be used. Other Link Models may be used for items whose observable is not dichotomous.

$$l(x_j \mid \theta, b_j) = P(x_j \mid \theta, b_j) = \frac{\exp(1.7x_j(\theta - b_j))}{1 + \exp(1.7x_j(\theta - b_j))} \quad (1)$$

Prior to observing the observables, the likelihood (or Link Model) may be a predictive distribution. After observing the observables, Bayes theorem may be used to update the state of knowledge about the unknown Student Model 105 variable, θ. By observing a collection of outcomes $(x_1, \ldots, x_J)$ (for items $1, \ldots, J$), the posterior distribution for θ may be computed as shown in Eqn. 2.

$$p(\theta \mid x_1, \ldots x_j, b_1, \ldots, b_n) \propto p(\theta) \prod_{j=1}^{n} l(x_j \mid \theta, b_j) \quad (2)$$

(this expression may be divided by a normalization constant to make the total probability for all potential values of θ equal to 1). Accordingly, the probability distribution may be factored into the prior distribution and a contribution of the likelihood of each task since the outcomes for different tasks are considered to be independent (according to the design of the assessment).

The statistics for the posterior distribution may be used to determine the examinee's ability. The expected value of the posterior distribution may provide an estimate of ability for the examinee. The variance of the posterior distribution may provide a certainty for the estimate. The mode of the posterior distribution may also be used in determining the estimate for the examinee.

Inferences regarding Student Model 105 variables may also be made using graphical models and Bayesian networks. Graphical models are multivariate statistical models in which the variables are represented by nodes in a graph and edges joining the nodes represent dependencies. In particular, if two variables in a graph are separated by a set of separator variables, the variables may be conditionally independent given the separating set. Two representations for graphical models are described below.

Figure 5A:
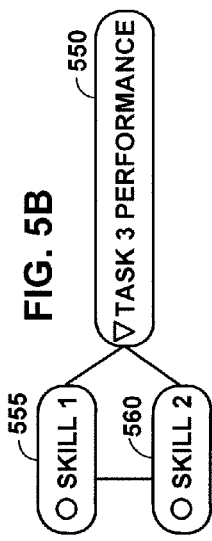
FIGS. 5a and 5b depict exemplary undirected graphical models according to an embodiment.
Figure 5B:
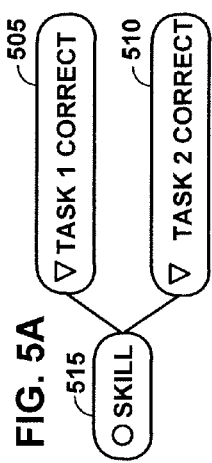

Undirected graphs may be used to emphasize independence conditions. FIGS. 5a and 5b depict exemplary undirected graphical models. In FIG. 5a, the task observables 505, 510 may be independent given the skill variable 515, as is typically the case when an assessment is constructed. In FIG. 5b, the task observation 550 may be influenced by both skills 555, 560. The edge between the two skills 555, 560 may either represent correlation between the presence of each skill 550 in the target population or that making an observation induces a dependence in knowledge regarding Skill 1 555 and Skill 2 560.

Figure 6A:
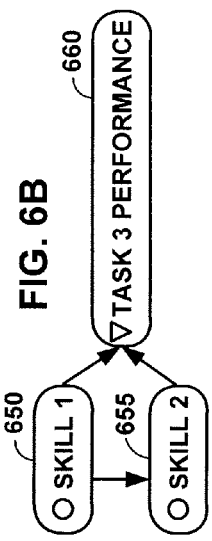
FIGS. 6a and 6b depict exemplary directed graphical models according to an embodiment.
Figure 6B:
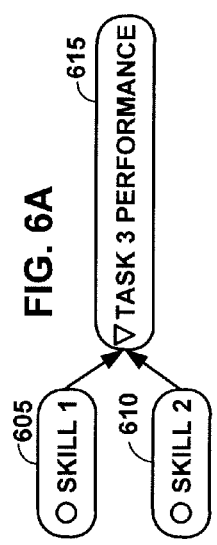

Directed graphs depict additional independence relationships. In FIG. 6a, information regarding the presence of two skills 605, 610 in the examinee may be independent if no observation of task performance 615 has been made. Once an observation is made, however, the presence of the two skills may become dependent. In FIG. 6b, dependence of the skills 650, 655 prior to observation of task performance 660 in the population is shown.

Figure 7A:
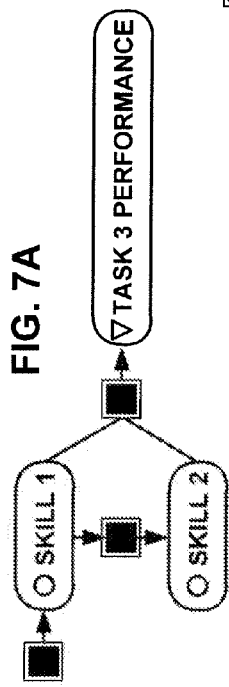
FIGS. 7a and 7b depict exemplary directed hypergraphs according to an embodiment.
Figure 7B:
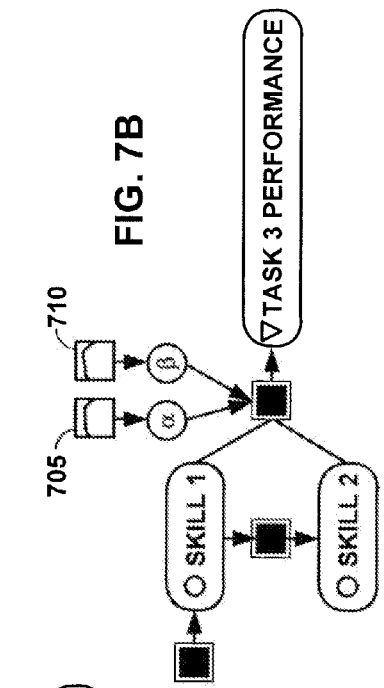

Directed graphs may depict the factorization of the distribution. For example, in FIG. 6a, the factorization is:

$P(\text{Skill1},\text{Skill2},\text{Task3Performance}) = P(\text{Skill1})P$
$(\text{Skill2})P(\text{Task3Performance}|\text{Skill1},\text{Skill2}) \quad (3)$ For FIG. 6b, the factorization is:

$P(\text{Skill1},\text{Skill2},\text{Task3Performance}) = P(\text{Skill1})P$
$(\text{Skill2}|\text{Skill1})P(\text{Task3Performance}|\text{Skill1},\text{Skill2}) \quad (4)$ FIGS. 7a and 7b depict directed hypergraph representations for FIG. 6b. FIG. 7a includes icons representing each factor in the graphical model to aid in computing the factorization. FIG. 7b incorporates parameter distributions 705, 710, which are useful in describing the Markov Chain Monte Carlo algorithms described below.

If all variables are discrete, the directed graphical model is called a Bayesian Network or a Bayesian Information Network ("BIN"). If all variables are continuous and their distributions are normal, a multivariate normal distribution may be generated. In either of these cases, computations may be done in closed form.

If pretest data are available, the Student Model 105 and Link Models may be calibrated to the pretest data. One method for performing this calibration is the Markov Chain Monte Carlo algorithm. MCMC algorithms may permit an estimate of an expectation of a probability distribution, such as a posterior mean, using samples of the probability distribution to generate a sample average as an estimate of the expectation. For example, suppose X is a vector of K random variables with distribution π(X). X may comprise model parameters and missing data and π(•) may be a posterior distribution. In this case, Eqn. 5 is computed to determine the expectation:

$$E[f(X)] = \frac{\int f(x)\pi(x)dx}{\int \pi(x)dx} \quad (5)$$

Monte Carlo integration may evaluate E[f(X)] by drawing samples $\{x_t, t=1, \ldots, n\}$ from π(•) and then using $$E[f(x)] \approx \frac{1}{n}\sum f(x_t)$$

as the estimate. When the samples $x_t$ are independent, the law of large numbers may ensure that a more accurate approximation for the expectation may be achieved by increasing the sample size n. Even if the samples $x_t$ are not independent draws from π(•), if sufficient samples are drawn to form a series which converges into distribution with π(•) and whose autocorrelation is bounded, the Monte Carlo estimate may converge to the desired value. Thus, if the series $x_t$ is generated by a Markov chain having π(•) as its stationary distribution, consistent estimates of E[f(X)] may be made.

As an example, a sequence of random variables $\{X_0, X_1, X_2, \ldots\}$ may be generated such that each time $t \geq 0$, the next state, $X_{t+1}$, is sampled from a distribution $P(X_{t+1}|X_t)$, which depends only on the current state of the chain $X_t$. In other words, $X_{t+1}$ does not depend on $\{X_0, X_1, \ldots, X_{t-1}\}$ given the value of $X_t$. This sequence is called a Markov chain, and $P(\bullet|\bullet)$ is called the transition kernel of the chain. $P(\bullet|\bullet)$ does not depend on t.

A stationary distribution of the Markov chain, generated using samples $\{X_{m+1}, \ldots, X_n\}$ may be used to estimate the expectation E[f(X)]. Two methods of generating Markov chains whose stationary distribution is the distribution of interest are Gibbs sampling and the Metropolis-Hastings algorithm.

Gibbs sampling may depend on the fact that while $\pi(X)$ may be difficult to sample from, $\pi(X_j|X_{-j})$ is often a convenient distribution from which to work. $X_{-j}$ represents all of the variables X except $X_j$. A Markov chain may be generated by using the value of $X_{-j}$ sampled at time t to produce the estimates for time t+1. In particular, a graphical model may be used to determine an efficient Gibbs sampler. The independence conditions of the graphical model show that a given node (variable) is independent of all other nodes based on its neighbors in the graphs. Thus, a Gibbs sampler may be generated by visiting all of the nodes in the graph in order and sampling from the distribution of each node given its neighbors. One problem with Gibbs sampling is that calculating $\pi(X_j|-X_j)$ may involve an integral that may not be analytically solvable.

The Metropolis-Hastings algorithm is a method of generating a Markov chain that avoids calculating the integral that may be generated in computing the Gibbs sampler. The Metropolis-Hastings algorithm may use a second distribution, the proposal distribution $q(X_t,Y)$, to choose the next value for $X_{t+1}$. However, it may only accept the proposed move Y with probability:

$$a(X, Y) = \min\left\{1, \frac{\pi(Y)q(Y, X)}{\pi(X)q(X, Y)}\right\} \quad (6)$$

If Y is rejected, $X_{t+1}=X_t$. Table 1 describes the algorithm in psuedocode. The acceptance function $\alpha(\bullet,\bullet)$ may only depend on a ratio of the posterior distribution.

TABLE 1

Psuedocode for Metropolis-Hastings algorithm

```
t←0
X_0←Initial values
Repeat: {
    Y←sample from q(..X_t)
    U←sample from Uniform(0,1)
    If U <= a(X_t,Y)
        X_{t+1}←Y
    Otherwise
        X_{t+1}←X
    t←t + 1
}
```

Methods combining Gibbs sampling and the Metropolis-Hastings algorithm may be used. For example, Gibbs sampling may be performed for variables for which $\pi(X_j|X_{-j})$ is available in closed form, and Metropolis-Hastings may be performed for other variables.

When the population of examinees or tasks is divided into multiple groups, the use of hierarchical modeling may make calibration more efficient. For example, examinees may be grouped by schools and further grouped by classrooms within schools. Bayesian statistical methods may exploit such a hierarchy to obtain insights from similar observations. Such insights may be called shrinkage estimators because estimates for individuals may be shrunk towards the mean for the group.

Table 2 illustrates an example of this principle taken from A. Gelman, J. B. Carlin, H. S. Stern, and D. B. Rubin, *Bayesian Data Analysis*, London: Chapman & Hall, pp 141-148. Table 2 depicts an exemplary regression estimate of coaching on the SAT-V scores for examinees in eight high schools with coaching programs. The first two columns show means and standard errors of the estimate from each school. The third column shows the posterior median of the shrinkage estimator for each school. The last column may be used to provide posterior quartiles. Assuming that the schools are likely to be similar to each other, the Bayesian estimates may be "shrunk" towards the average effect across all schools (7.9 points). Note that the posterior deviations are from the standard error of the original unpooled estimates.

TABLE 2

Hierarchical Modeling for Coaching Schools

| | Original Estimates | | Posterior Adjusted Estimates | |
|---|---|---|---|---|
| School | Effect, $y_i$ | Std Error, $\sigma_i$ | Median | Std. Deviation |
| A | 28.39 | 14.9 | 10 | 6.67 |
| B | 7.94 | 10.2 | 8 | 6.67 |
| C | -2.75 | 16.3 | 7 | 6.67 |
| D | 6.82 | 11.0 | 8 | 5.19 |
| E | -0.64 | 9.4 | 5 | 6.67 |
| F | 0.63 | 11.4 | 6 | 5.93 |
| G | 18.01 | 10.4 | 10 | 5.93 |
| H | 12.12 | 17.6 | 8 | 7.41 |

A lower level of a hierarchical model may be assumed to be independent draws from a population defined at the next higher level. The variance at the lower level may describe how closely the subjects at that level are grouped around the average effect. If the variance is small, the experiential data may apply more accurately to the current examinee.

The above-presented technique may be used to reduce pretesting when applied to a task-specific Link Model calibration. By using experiential data with the same Task Model, the variance associated with the Task Model parameters may be vastly reduced without a significant increase in the sample size. This reasonably assumes that tasks in the same branch of the task hierarchy have similar psychometric properties. This may be achieved by closely monitoring the design of Task Models 110 and controlling the features which are radicals in the task design.

Framework

ECD model objects may provide the basic outline of a model used for calibration. The Task Models 110 and task specifications may be used to determine the observable information expected from each task. The Assembly Models 120, Task Models 110 and Evidence Models 115 may specify the expected results from a pretest. The Student Models 105 and Evidence Models 115 may specify the parameters used for calibrating the model. Finally, the Link Model Priors may provide more specific priors for specific task specifications.

The ECD object model may provide all of the prior information for a Bayesian model using MCMC estimation. This data may be used to construct a MCMC engine that performs the calibration and other pretest analyses for the model.

A simple example is provided to describe the workings of the model. The example may include an assessment for which all of the tasks come from a single Task Model 110. Further, the model may include only one task specification/task design object and thus the task hierarchy may have only two levels. The Student Model 105 of the example may have exactly one variable, $\theta_i$, which represents the examinee's proficiency to answer questions of this type correctly, and one observable for task j, $X_{ij}$ (note that the observable is different for each examinee and thus two indices are used), which is a Boolean variable having a value of "true" if the response to the task was "correct." Finally, the Evidence Model 115 of the example may include a single difficulty parameter, $b_j$, to model the propensity of examinees at a given ability level to answer the task correctly.

Figure 8:
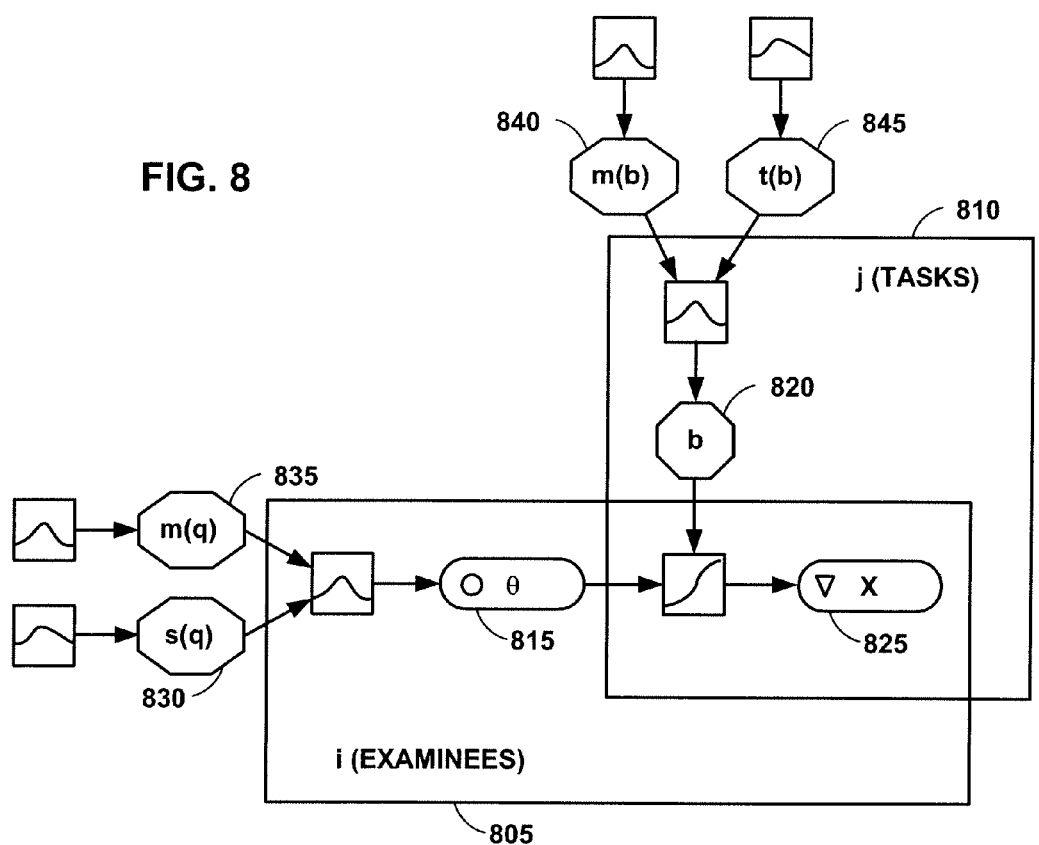
FIG. 8 depicts a graphical model of an exemplary evidence centered design object model according to an embodiment.

FIG. 8 graphically models this example. The examinee plate 805 may indicate replication of the operations contained therein for each examinee. The task plate 810 may indicate replication of the operations contained therein for each task. The score model variables $\theta_i$ 815 may be replicated over examinees and the Link Model parameters $b_j$ 820 may be replicated over tasks. The observables $X_{ij}$ 825 may be replicated over both examinees and tasks. Each of the parameters 830-845 may be fixed and known, may be determined by setting up prior distributions for the parameters 830-845, or may be determined using other methodologies as described herein or as known to one of ordinary skill in the art.

The model may be calibrated in at least two ways. First, an EM algorithm, which alternates between picking the best value so far for $\theta_i$ 815 and estimating $b_j$ 820, and picking the best value for $b_j$ 820 and estimating $\theta_i$ 815, may be used. Second, a Gibbs sampler may alternate between sampling $\theta_i$ 815 and $b_j$ 820. More complex models may also be derived from these calibration methods, examples of which are described below.

Three sources of knowledge regarding tasks may be used to increase certainty about task-specific Link Model parameters: (i) pretest data regarding tasks, (ii) the similarity of tasks to other tasks which are already calibrated and (iii) the radical features of the tasks believed to predict task difficulty.

For each task, the value of all Task Model 110 variables may be known. However, those variables may perform a plurality of roles within the assessment. Some variables may be used to guide the authors; some may be used to ensure breadth of coverage or to prevent overlap; still others may govern difficulty. The variables in the last set are called radicals, and the vector of radicals for Task j is defined as $r_j$.

A vector of parameters $b_j$ may be associated with each task. The parameters may be unknown but with a distribution of $F_j(\mu(b_j), \tau(b_j))$, where $\mu(b)$ is the location parameter and $\tau(b)$ is a scale parameter (variance matrix). Each Link Model associated with the same Task Model 110 may have a common distributional form. Furthermore, this example may assume that a common scale parameter is used. If m(j) is the index of the Task Model 110 and Evidence Model 115 for Task j, the parameter distribution may be reduced to $F_{m(j)}(\mu(b_{m(j)}), \tau(b_{m(j)}))$.

Once the parameter distribution is determined, the radicals may be linked to the predictor using, for example, a linear regression. Since IRT parameters often have restricted ranges, a conventional transform of the raw parameters b to approximately normally distributed parameters, $\beta=g(b)$, may be performed. In a 3PL IRT model, the logarithm of the discrimination parameter and the logit of the guessing parameter may be computed, and the difficulty parameter may be left in the natural scale.

$\beta_j$ may be modeled as a linear function of the radicals, $r_j$. Particularly, $E(\beta_j|r_j)=w'_{m(j)}r_j$ and $Var(\beta_j|r_j)=\Sigma_{m(j)}$. The regression weights $w'_{m(j)}$ and the covariance matrix $\Sigma_{(j)}$ are parameters of the entire Evidence Model 115 and not task-specific Link Model parameters.

Knowledge of the effect size of the radical $r_{j,k}$ (i.e., $w_{m(j),k}$) may be modeled as being normal with mean $\mu(w_{m(j),k})$ and standard deviation $\sigma(w_{m(j),k})$ since the model essentially encompasses a linear space. These priors may be generated from domain expert knowledge regarding the effect of the radicals. If the radicals are appropriately set, increasing values of the mean may indicate that the radical has a stronger effect in making the task more difficult. The standard error may be set based on an expert's confidence of the strength of the radical's effect on the mean. In addition, the effect of the interaction of radicals on the task difficulty, and not just the effect of the radicals themselves, may be considered. These interaction effects may be considered in the set of predictions for the radicals. The interaction effects may be represented as follows: "A+B" may indicate that variables A and B are both radicals, but that their interaction is not a radical. "A*B" may indicate that the interaction of variables A and B is a radical as well. The notation "school/classroom" may indicate that the classroom effect should be nested within schools (i.e., Classroom 1 within School 1 may have a different effect size than Classroom 1 within School 2).

Depending on the collection of tasks in the pretest set, all radicals may not be included in the model. For example, if a radical only possesses one value for all tasks in the pretest collection (within a Task Model 110), the effect of the radical may not be estimable. Similarly, if the value for one radical always equals the value of a second radical or a linear combination of other radicals, the radical is aliased. In the case of an aliased radical, the values of the parameters for the radical may not be determined from the data.

Figure 9:
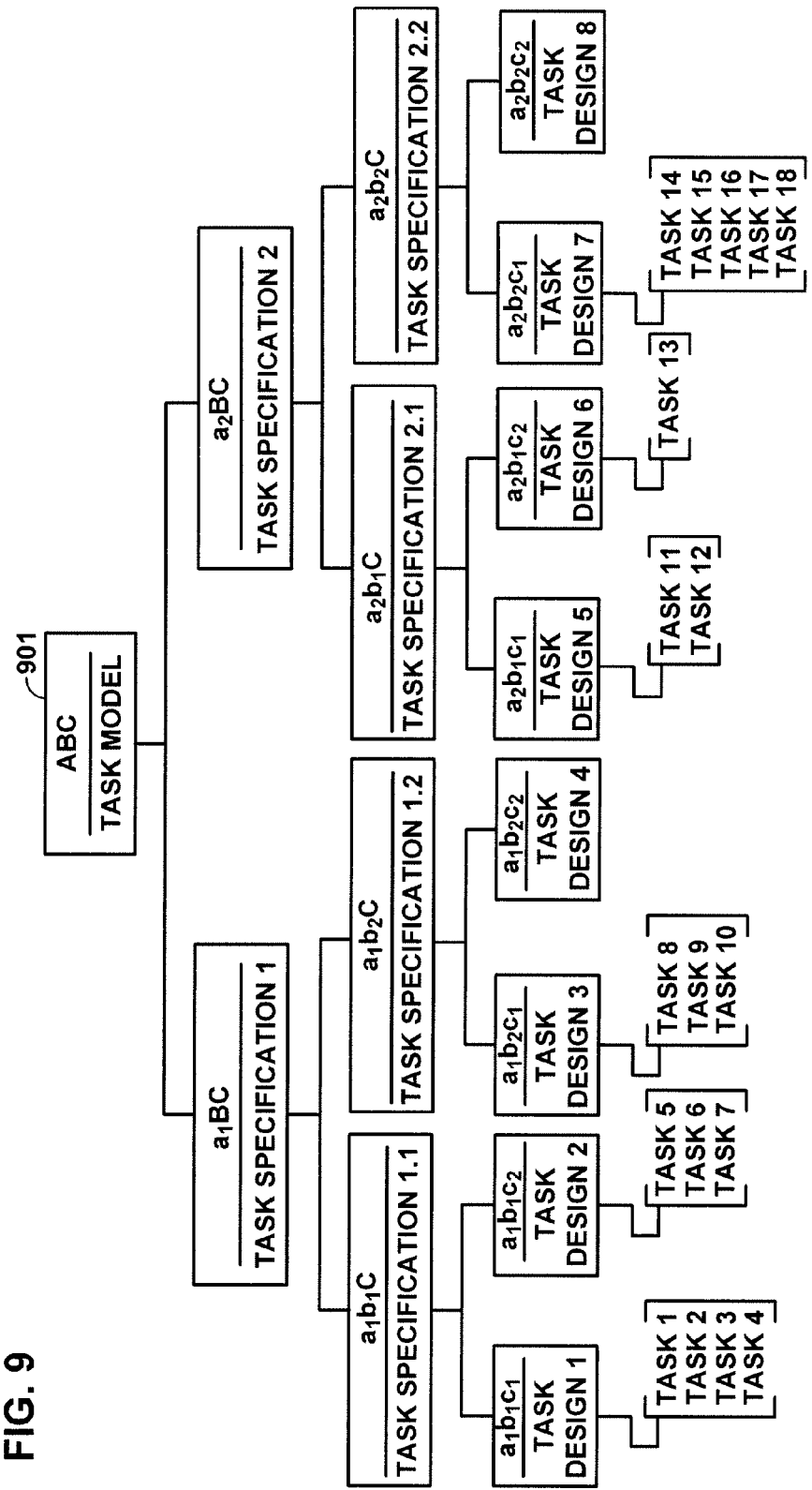
FIG. 9 illustrates an exemplary aliasing of task design or task specification membership factors to radicals according to an embodiment.

The task design or task specification membership factors may be aliased to radicals. FIG. 9 illustrates an exemplary aliasing of these factors. In FIG. 9, splits are made on the Task Model 901 variables A, B, and C. Accordingly, the task design effect is exactly the same as A*B*C.

If complete aliasing does not occur, highly correlated radicals may also be inestimable because of colinearity. Colinearity may cause the posterior distribution to have a large variance. As such, unstable estimates of $w_{m(j)}$ may occur despite acceptable predictions for overall task difficulty. Such unstable estimates may arise if the distribution of the values of a Task Model 901 variable among the pretest sample was poor (for example, if 90% of the tasks in one Task Model 901 have the same value for one of the variables). If the prior distributions for the radical effects have small variance, colinearity effects may be small.

Generally, assigning scores to pretest examinees may not be of great interest. However, even in the simple model of FIG. 8, two parameters may be determined for the population of examinees: (i) the location parameter, $\mu(\theta)$, and (ii) the scale parameter, $\sigma(\theta)$. In an ongoing assessment program, however, these population parameters may be well known. The parameters may be considered to be fixed in this case. The parameters may also be fixed to provide identifiability to a scale.

To facilitate learning these parameters, a score model may be created for each examinee. A score model may be an instance of the Student Model 105 for a specific examinee and may include an instance of each Student Model 105 variable for each examinee. Values for these variables may be imputed in each cycle of a Markov Chain. The imputed values may be useful for performing model checking.

Typically, a subset of examinees may receive each task in a pretest environment. Thus, if J(i) is the set of tasks which an examinee is assigned in a pretest, a task not in J(i) may provide no information about examinee i. Similarly, examinee i's responses may provide no direct information about task j if the examinee never saw the task. Therefore, a Link Model may not be created for task evidence combinations i,j for which j∉J(i). Other kinds of non-responses may or may not be ignorable. For example, missing observables due to a computer network failure provide little information regarding the parameters of interest and may be ignored. However, the relevance of a task that is skipped or never reached by an examinee may depend on the scoring rules for the test. The evidence rules may provide guidance on the proper handling of such cases.

Figure 10:
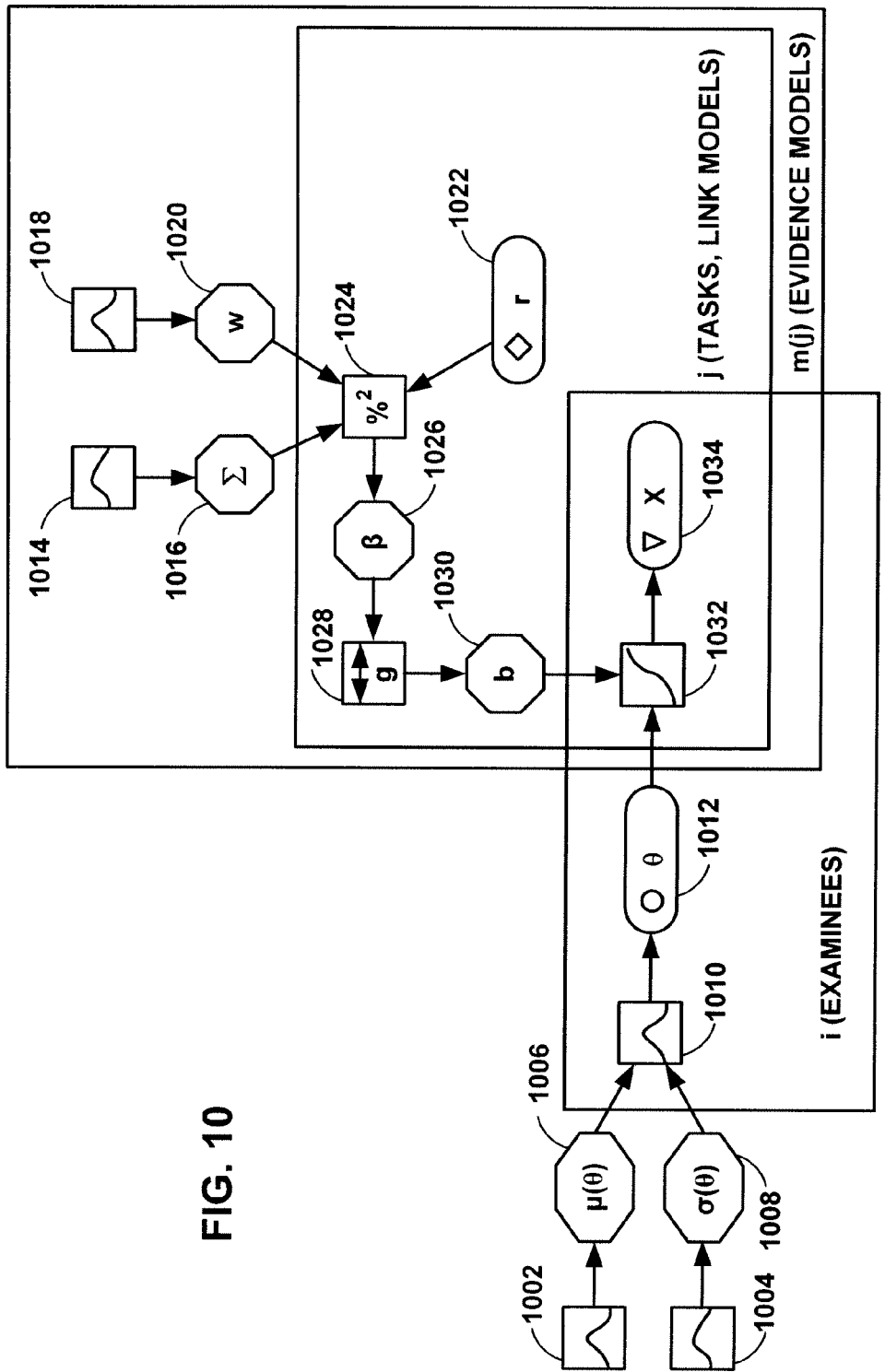
FIG. 10 depicts a complete graphical model of an exemplary embodiment.

FIG. 10 depicts a complete graphical model according to an embodiment. The embodiment may iterate over each of pretest examinees, task/Link Model composites, and Task Model 110/Evidence Model 115 composites. $X_{ij}$ 1034 may represent examinee i's observed outcome from task j. The variable $\theta_i$ 1012 may represent examinee i's knowledge, skill and abilities. $\theta_i$ 1012 may be vector valued and may have a complex structure (i.e., a graphical model). The variable $r_j$ 1022 may represent the values of the radical for task j. The student model parameters may be described in terms of a set of location parameters $\mu(\theta)$ 1006 and scale parameters $\sigma(\theta)$ 1008 for the entire examinee population. Each of these parameters may be further subdivided if θ 1012 has a complex distribution.

Each task-specific Link Model may include a collection of Link Model parameters $b_j$ 1030. Each Link Model having the same Evidence Model 115 may also share a common set of regression weights $w_{m(j)}$ 1020 and scale parameters $\Sigma_{m(j)}$ 1016. $b_j$ 1030 is not a free parameter, but rather a deterministic transformation of $\beta_j$ 1026. Thus, $\beta_j = w'_{m(j)} r_j$ and $b_j = g_{m(j)}(\beta_j)$. As such, directly sampling values for $b_j$ 1030 is not required.

The hyperedges in FIG. 10 may represent the distributions or laws in the model. Each distribution may provide the prior distribution for one set of variables or parameters. Each distribution may also provide likelihood information to other parameters or variables. Each distribution or law may contain internal data augmentation variables.

The Link Model Distributions 1032 may provide distributions for the observables given the student model variables and the Link Model parameters, $Pr(X_{i,j}|\theta_i, b_j)$. Each Link Model Distribution 1032 may correspond to a non-zero element in J(i).

The Score Model Distributions 1010 may provide the score model variables for the Student Model 105 parameters, $Pr(\theta_i|\mu(\theta), \sigma(\theta))$. Each Score Model Distribution 1010 may correspond to a pretest examinee.

The Student Model Parameter Laws 1002 and 1004 may contain the distributions for the mean and scale parameters. One set of Student Model Parameter Laws 1002 and 1004 may exist for the entire population. The number of dimensions and any factorization of the Student Model Parameter Laws 1002 and 1004 may be determined by the Student Model 105. The prior hyperparameters for these laws 1002 and 1004 may be specified at design time and may be stored within the laws themselves.

The Link Function 1028 may provide the parameters in the linear space $\beta_j$ 1026 with the parameters in natural space $b_j$ 1030. The Link Function 1028 is merely a function rather than a distribution or law.

The Regression Law 1024 may represent the relationship between the transformed parameters $\beta_j$ 1026, the task specific radical $r_j$ 1022 and the Evidence Model 115 specific regression weights $w_{m(j)}$ 1020 and covariance $\Sigma_{m(j)}$ 1016.

The Regression Weight Laws 1018 may represent the distribution of the regression weights 1020. Each Regression Weight Law 1018 may correspond to an Evidence Model 115. Each law 1018 may further contain its own hyperparameters.

The Scale Parameter Laws 1014 may represent the distribution of the covariance matrix for the Regression Law 1024. Each Scale Parameter Law 1014 may correspond to an Evidence Model 115 and may contain its own hyperparameters.

In an embodiment, the model described in FIG. 10 may be implemented by fitting the model using a Metropolis-Hastings algorithm within Gibbs sampling. Each variable or parameter object in FIG. 10 may have a value sampled conditioned on its neighbors in the model. If possible, a Gibbs sampling may be performed. Typically, a Gibbs sampling may be performed for each Student Model parameter 1002 and 1006. If a Gibbs sampling cannot be performed, a Metropolis-Hastings algorithm may be used to accept or reject the next value. Each distribution or law object may be responsible for determining whether a Gibbs sampling can be performed based on the likelihoods that are provided to it. Moreover, each distribution may determine whether augmented variables should be introduced to make the parameters easier to fit.

The deterministic parameters $b_j$ 1030 may require separate functionality. Since the parameters 1030 are not directly sampled, the transformed parameters $\beta_j$ 1026 may be sampled, and the transformed result may be stored in the parameters 1030.

In general, the MCMC algorithm may include three phases: (i) Initialization, (ii) MCMC Iteration, and (iii) Output Reporting. The Initialization phase may be further subdivided into a parameter phase and a variable phase. In the parameter phase, a starting point for the Markov Chain may be selected. The choices may include, for example, (i) all parameters near midpoints of a prior distribution; (ii) all parameters in the upper tail of the prior distribution; (iii) all parameters in the lower tail of the prior distribution; (iv) half of the parameters in the upper tail of the prior distribution and half of the parameters in the lower tail of the prior distribution; (v) half of the parameters in the lower tail of the prior distribution and half of the parameters in the upper tail of the prior distribution (i.e., the mirror image of (iv)); and (vi) values selected randomly from the prior distribution for the parameters. For each Student Model 105, initial values may be drawn for all Student Model parameters 1004 and 1008. For each Evidence Model 115, initial values may be drawn for the regression weight parameters 1020 and covariance parameters 1016. For each task included in the design, the Evidence Models 115 used to score the task may be determined, a Link Model may be created for each of the Evidence Models 115, and initial values may be drawn for each of the Link Model parameters.

In the variable phase, the following functions may be performed for each examinee: (i) a scoring model for the examinee may be initialized from the Student Model 105; (ii) evidence based on pretest observables may be obtained from the Link Model for each task presented to the examinee; (iii) values may be imputed for each Student Model 105 variable for the examinee's scoring model; and (iv) values may be imputed for any missing or latent Evidence Model 115 variables for the Link Model for each task presented to the examinee.

The MCMC iteration phase may be subdivided into three sub-phases: (i) the parameter phase, (ii) the variable phase, and (iii) the end of loop processing phase. The parameter phase samples new values for each parameter within each Student Model 105, each Evidence Model 115 and each Link Model by performing either a Gibbs or Metropolis-Hastings step. Each parameter may be recorded if it is being monitored and the cycle is a recording cycle for the parameter.

In the variable phase, the following functions may be performed for each examinee: (i) a scoring model for the examinee may be initialized from the Student Model 105; (ii) evidence based on pretest observables may be obtained from the Link Model for each task presented to the examinee (i.e., the scoring algorithm on the pretest data with the current value of the Student Model 105 and Evidence Model 115 may be performed); (iii) if the cycle is being recorded, values for statistics may be calculated; (iv) values may be imputed for each Student Model 105 variable for the examinee's scoring model; (v) if a particular variable is being recorded in this cycle, a sample value for the variable may be recorded; (vi) values may be imputed for any missing or latent Evidence Model 115 variables for the Link Model for each task presented to the examinee; and (vii) if a particular variable is being recorded in this cycle, a sample value for the variable may be recorded.

The end of loop processing phase may determine whether parameters have converged. If the parameters have not yet converged, convergence criteria may be calculated. Proposal distributions for the Metropolis-Hastings distribution may then be revised. A recording flag may be set for the next cycle to determine whether the next cycle is recorded. Finally, when a desired number of samples is achieved, the MCMC iteration phase may end.

The output reporting phase may output an assessment description file for calibrated tasks and a post-calibration pretest data file containing, inter alia, summary scores for examinees.

Figure 11:
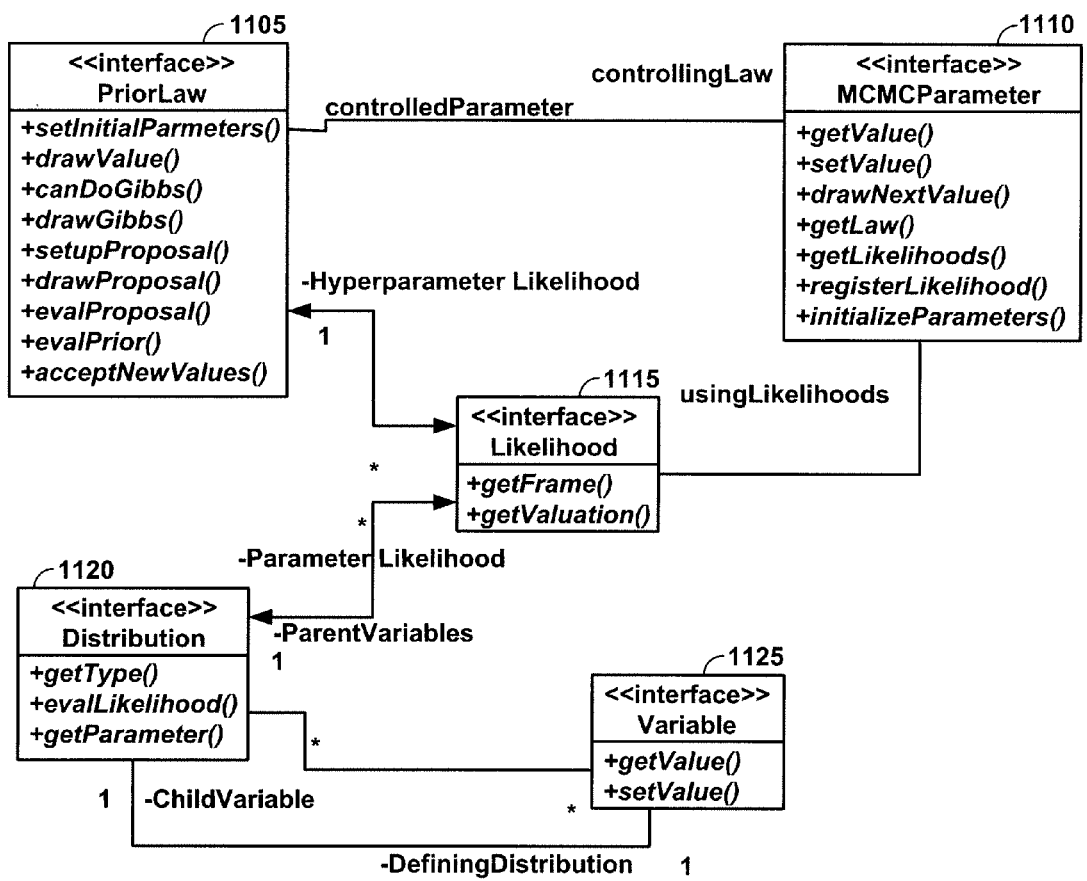
FIG. 11 depicts code object interfaces for implementing an embodiment.

FIG. 11 depicts code object interfaces according to an embodiment. MCMCParameter 1110 may include functions common to all parameters. Variable 1125 may include functions common to all variables. The Distribution object 1120 may provide the distributions for Variable 1125. A variable which has its value controlled by a distribution is called a "child" of the distribution. Many distributions are conditional on other variables, which are called "parents." The set of variables for a distribution is called a "frame."

Typically, a distribution may be defined in terms of one or more parameters. These parameters are represented in FIG. 11 by the MCMCParameter objects 1110. A MCMCParameter object 1110 may have a vector, matrix or other composite value. The distribution may be linked to the parameter through a Likelihood object 1115. The Likelihood 1115 may be a part of the Distribution object 1120 and have access to all variables and other parameters relating to that Distribution. The Likelihood object 1115 may also be associated with a PriorLaw object 1105.

If the parameter's value is to be learned by calibration, it may be assigned a controlling distribution, which implements the PriorLaw interface 1105. An MCMCParameter 1110 which has its value provided by the PriorLaw interface 1105 is said to be "controlled" by that law. The PriorLaw object 1105 may have parameters called "hyperparameters." A Likelihood 1115 that is part of the PriorLaw object 1105 may link the law and its parameters. The connection between a PriorLaw object 1105 and the MCMCParameter object 1110 may be direct, while the connection between a PriorLaw object and hyperparameters may be via a Likelihood 1115.

Figure 12:
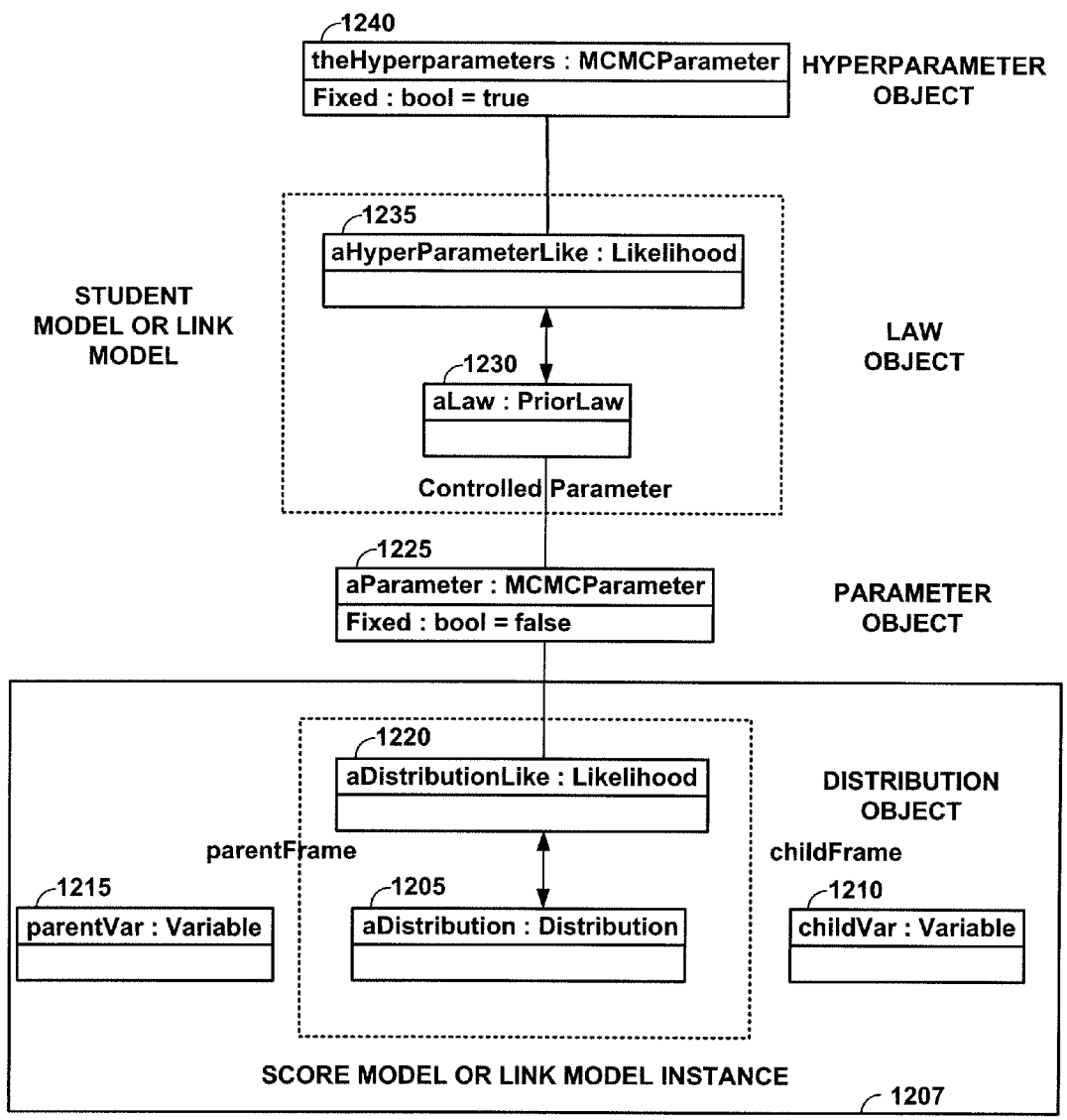
FIG. 12 depicts an exemplary implementation of objects according to an embodiment.

FIG. 12 depicts an implementation of an embodiment incorporating these interfaces to describe a Student Model 105 and its scoring models. The distribution of interest 1205 may be maintained in the scoring model 1207, where the value of the variables are sampled for each examinee. The distribution 1205 may be linked to a child variable 1210 and one or more parent variables 1215 and may use a parameter 1225 to define its valuation. The parameter 1225 may be common across all examinees and may be a part of the Student Model 105, not the scoring model 1207. The distribution 1205 may be connected to the parameter 1225 through a likelihood 1220. Since one scoring model is used for each examinee, the parameter 1225 may contain references to a plurality of likelihoods 1220.

A PriorLaw object 1230 may control the parameter 1225. The PriorLaw object 1230 may be controlled by hyperparameters 1240. Hyperparameters 1240 may have fixed values since they have no controlling laws. The PriorLaw object 1230 may be connected to the hyperparameters 1240 through a likelihood 1235. However, since the hyperparameters 1240 are fixed, the likelihood 1235 may be unused. If the hyperparameters 1240 had a controlling law (e.g., if this were a hierarchical model), then the likelihood 1235 may be used.

Referring back to FIG. 11, the Variable interface 1125 may be relatively simple. Two functions may be defined for the Variable interface 1125. The first may set the value of the variable. The second may retrieve the current value. Distributions 1120 may use variables' values when calculating likelihoods 1115. Each variable 1125 is output from exactly one distribution 1120, but may be an input to a plurality of distributions.

The MCMCParameter interface 1110 may sample a plurality of parameters in each cycle. Parameters and hyperparameters may have approximately the same function in an MCMC model in that their values are updated when sampling occurs. Accordingly, both parameters and hyperparameters may be defined by the MCMCParameter interface 1110. Each MCMCParameter interface 1110 may include functions for setting and retrieving the current value of the parameter. In addition, each MCMCParameter 1110 may have a PriorLaw interface 1105 that describes its distribution and may be used in a Likelihood interface 1115. The getLaw( ) and getLikelihood( ) functions may provide links to the PriorLaw interface 1105 and the Likelihood interface 1115, respectively. The drawNextvalue( ) function may be used to sample the next value. A parameter initialization function may also be provided.

The Distribution interface 1120 may include a function for returning the frame of the distribution, which is fixed. A second function may return the valuation of the Distribution 1120 (the value of the distribution's child variable) based on the value of the distribution's parent variables. A current value of the valuation may depend on the current values of any parameters 1110 that the distribution 1120 uses. Thus, the valuation may change with each cycle. The distribution 1120 may connect itself to the parameter 1110 through a likelihood 1115. If multiple copies of a distribution 1120 are made, such as in the case of score models copied from a Student Model 105, each copy may share the same parameter value. However, all uses of the parameter may be considered when computing the full conditional distribution for the parameter. Thus, each time a distribution 1120 is copied, a new likelihood 1115 may be registered with the parameter 1110.

PriorLaw objects 1105 may provide the primary definitions for parameters 1110. PriorLaw objects 1105 may provide a mechanism for sampling values for the parameter during the initial setup phase and the MCMC cycle. Moreover, PriorLaw objects 1105 may determine, based on the types of Likelihood objects 1115, whether a Gibbs sample is used to perform an exact calculation or whether a Metropolis-Hastings step is performed.

During initialization, the PriorLaw interface 1105 may assign an initial value to each parameter 1110. In an embodiment, a flag may be used to determine whether the initial value is drawn from the lower tail, the median or the upper tail of the parameter's distribution. During operation of the MCMC cycle, each parameter 1110 may request a new sampled value from its PriorLaw 105. In doing so, the parameter 1110 may pass each likelihood 1115 associated with the parameter to the PriorLaw interface 1105, which may determine whether the likelihood objects are used to perform Gibbs sampling. If Gibbs sampling is not performed, a Metropolis-Hastings sample may be performed instead. The calculation for a Metropolis-Hastings sample may be broken down into further steps. A proposal distribution may first be set. The proposed value of the parameter, Y, may be sampled using the proposal function $q(\bullet, X_t)$, where $X_t$ is the current value of the parameters. The decision to accept or reject the sample may be made based on evaluations of the posterior distribution and the proposal distribution at the old value of the parameter, $X_t$, and the new value of the parameter, Y. The posterior distribution may be equal to $$\pi(X) \prod_{alluses} l(\text{data} \mid X),$$

which may be achieved by evaluating the PriorLaw 1105 at the old and new values of the parameter and multiplying that by the likelihood for each Likelihood object 1115 connected to the parameter at the old and proposed values. The proposal function $q(X_t, Y)$ and its converse $q(Y, X_t)$ may then be computed.

A distribution 1120 may include a likelihood 1115 when it references a parameter 1110 to compute the distribution of a different variable. A law 1105 may include a likelihood 1115 when it references a hyperparameter. A distribution or law may serve as a likelihood for more than one parameter. For example, the normal distribution has a location parameter, $\mu$, and a scale parameter, $\sigma$. Thus, two likelihoods, one for each parameter, may be created in this case.

Eliciting Parameters and Laws

Subject matter experts may initially define variables and the relationships between latent and observable variables. These variables and relationships may be updated as data is received from subjects taking the assessment. In order to adequately update such variables and relationships, an assessment designer may perform the following steps: 1) define the variables for the proficiency and evidence models; 2) define the relationships among the variables; 3) for each variable, choose a distribution type which defines the relationship between the variable and its parent variables; 4) for each distribution, establish the value of any parameters; and 5) for each distribution, establish a law (and appropriate hyperparameters) which describes uncertainty about the parameters. Distribution types may include a conditional multinomial distribution or a hyper-Dirichlet distribution.

A conditional multinomial distribution may be defined as follows: Y is a multinomial random variable that can take on one of K categories, and $Y_k$ is the number of observations which fall in category k in n experiments. The multinomial likelihood is then:

$$p(y \mid \theta, n) = \begin{cases} \binom{n}{y_1 \ldots y_k} \theta_1^{y_1} \ldots \theta_K^{y_K} & \text{for } y_k = 0, \ldots, n \forall k \\ 0 & \text{otherwise.} \end{cases} \quad (7)$$

The natural generalization of beta law for $\theta$ is the Dirichlet law:

$$f(\theta \mid a) = \left[ \frac{\Gamma\left(\sum_{k=1}^{K} a_k\right)}{\Gamma(a_1) \ldots \Gamma(a_K)} \right] \theta_1^{a_1-1} \ldots \theta_K^{a_K-1}, \quad (8)$$

where $\theta_1 + \ldots + \theta_K = 1$. The Dirichlet law may be the natural conjugate for the multinomial distribution. The Dirichlet posterior given data y is Dirichlet $(a_1+y_1, \ldots, a_K+y_K)$. The beta distribution may be a special case of the Dirichlet distribution when the random variables are a vector of length two.

Assuming that variables are globally independent may allow the prior distribution to be constructed using one probability table at a time. Two types of probability tables may be parameterized: unconditional tables and conditional tables. Unconditional table data is multinomial, so the Dirichlet law may be the natural conjugate. Conditional table data may be in the form of a multinomial distribution for each configuration of the parent variables. This distribution is called a conditional multinomial distribution. Since the parameters of these multinomials are independent, the natural conjugate prior may be a collection of Dirichlet priors.

Constructing Dirichlet prior laws for every table in this way may produce a hyper-Dirichlet law. Under the global and local independence assumptions regarding parameters, the posterior distribution may also be a hyper-Dirichlet distribution. Hyper-Dirichlet distributions may have a large number of parameters to elicit, one for each parameter in the original network. The large number of parameters may also mean that a large amount of data may be necessary to reliably learn the parameters of the network. This may be especially problematic for configurations of parent variables that are rare. For example, if a distribution includes two parent variables, A and B, that are moderately correlated in the population, individuals that are very proficient at variable A and have no proficiency at variable B may be very rare in the population. Accordingly, it may be unlikely that the prior estimates can be improved.

Estimates may be improved upon by tying several rows of the table which are believed to have the same values together. In addition, parametric models may be used to describe the relationships between the parent and child variables with just a few parameters. Such parametric models may include a Noisy-Or model, a Noisy-And model, a compensatory distribution, a conjunctive distribution, a disjunctive distribution and an inhibitor distribution.

Noisy-Or and Noisy-And models each have readily interpretable parameters and separate the influences of their parent variables, which allows for factorizations of the probability distributions that can be exploited for efficient computation. The construction of a Noisy-And model will be discussed below.

If a task requires mastery of two skills for correct performance and both of those skills have been mastered by an examinee, then the outcome "response is correct" should be true. Otherwise, it should be false. This is a conjunctive model since both skills are necessary to solve the item. The following truth table represents the conjunctive model:

| Conditions | | Observed Outcome | |
|---|---|---|---|
| Skill 1 | Skill 2 | Right | Wrong |
| Yes | Yes | 1 | 0 |
| Yes | No | 0 | 1 |
| No | Yes | 0 | 1 |
| No | No | 0 | 1 |

Such a model may be unrealistic since an examinee who has not mastered one of the required skills may be able to guess the solution to a problem or solve it via a different mechanism than the one modeled, giving a false-positive result. The probability of a false-positive result may be defined as $\pi_-$. Moreover, an examinee who has mastered the required skills may still answer questions incorrectly on occasion through failure to apply the skills correctly, failure to recognize the correct solution path, or carelessness. In this case, a false-negative result may occur. The probability that examinees having the requite skill(s) answer the item correctly may be defined as $\pi_+$. The above model results in the following truth table.

| Conditions | | Observed Outcome | |
|---|---|---|---|
| Skill 1 | Skill 2 | Right | Wrong |
| Yes | Yes | $\pi_+$ | $1 - \pi_+$ |
| Yes | No | $\pi_-$ | $1 - \pi_-$ |
| No | Yes | $\pi_-$ | $1 - \pi_-$ |
| No | No | $\pi_-$ | $1 - \pi_-$ |

Alternatively, to solve an example problem, the participant must have either mastered Skill 1 or found a workaround for the lack of mastery. The probability of finding such a workaround may be defined as $r_1$. Similarly, $r_2$ may be the probability of finding a workaround for Skill 2. The truth table may be rewritten as:

| Conditions | | Observed Outcome | |
|---|---|---|---|
| Skill 1 | Skill 2 | Right | Wrong |
| Yes | Yes | 1 | 0 |
| Yes | No | $r_2$ | $1 - r_2$ |
| No | Yes | $r_1$ | $1 - r_1$ |
| No | No | $r_1 r_2$ | $1 - r_1 r_2$ |

The two models may be merged. Since $r_k$ and $\pi_-$ measure the same event, the latter may be removed to reduce the number of parameters. The final probability model is then:

| Conditions | | Observed Outcome | |
|---|---|---|---|
| Skill 1 | Skill 2 | Right | Wrong |
| Yes | Yes | $\pi_+$ | $1 - \pi_+$ |
| Yes | No | $\pi_+ r_2$ | $1 - \pi_+ r_2$ |
| No | Yes | $\pi_+ r_1$ | $1 - \pi_+ r_1$ |
| No | No | $\pi_+ r_1 r_2$ | $1 - \pi_+ r_1 r_2$ |

If only one of the skills were required to solve the problem, a Noisy-Or, or disjunctive, model would be appropriate instead of the Noisy-And model.

The remaining distributions may be methods of determining a real number representing an examinee's propensity to perform tasks of a specific type given a particular configuration of skills pertaining to such tasks. Although the test is multidimensional, any given observable within the task may represent a single direction within that multidimensional space. Each method may operate in, for example, three steps. First, a real number may be selected as an estimate for each input variable. Second, the estimates may be combined into an estimate of the examinee's propensity for performing the task. Finally, probabilities may be calculated for the dependent variable using the distributions.

The proficiency distribution for a variable may follow a normal distribution. Typically, a unit normal distribution may be used with a mean of 0 and a standard deviation of 1. To select the estimates, the normal distribution may be subdivided into a number of segments equal to the number of levels associated with a task (e.g., 3 for Low, Medium, and High aptitude). The midpoint of each of the three segments (in terms of probability values) may be selected as the estimate for each level. Thus, the estimates may equal $$m_k = \Phi^{-1}\left(\frac{2*k+1}{2K}\right),$$

where k is the level number, $m_k$ is the estimate, and $\Phi(.)$ is the cumulative normal distribution function.

Mapping from the parent variable to the probability for the estimates may be performed independently. That is, each knowledge, skill or ability represented by a parent variable may be assumed to have a separate dimension. The task observation may also have its own dimension. A combination function, $g(.)$, may be used to produce a composite estimate from a list of estimates. One method of combining values may be to sum all estimates. If more of one parent skill can compensate for the effect of lacking another, a compensatory distribution may result. If $\theta_1, \ldots, \theta_K$ are the estimates for the parent dimensions, the value for the child dimension may be $$\bar{\theta} = g(\theta_1, \ldots, \theta_K) = \sum_{k=1}^{K} \frac{\alpha_k}{\sqrt{K}} \theta_k - \beta.$$

Such a distribution is called a compensatory distribution because possession of a parent skill compensates for the lack of another parent skill. Such a distribution requires K+1 parameters, where K is the number of parent variables. This is a significant reduction from the hyper-Dirichlet model which requires $2^K$ parameters.

Other models may include a minimization or maximization function instead of a summation. The structure function $$\bar{\theta} = g(\theta_1, \ldots, \theta_K) = \min_{k=1}^{K} \alpha_k \theta_k - \beta,$$

may produce a conjunctive distribution where all skills are necessary to solve the problem. Similarly, the structure function $$\bar{\theta} = g(\theta_1, \ldots, \theta_K) = \max_{k=1}^{K} \alpha_k \theta_k - \beta,$$

may produce a disjunctive distribution where each parent variable represents an alternative solution path.

An inhibitor distribution may occur when a specific attribute level is required in order to complete a task. For example, an assessment item may require proficiency with the language in which it is written. If the examinee is not proficient to, e.g., a level r in the particular language, the examinee may not complete the task. For two variables, where a proficiency is required for variable 1, the inhibitor distribution may be modeled as $$\bar{\theta} = g(\theta_1, \theta_2) = \begin{cases} \theta_2 & \text{for } \theta_1 \geq \theta_{1,r}, \\ \theta_{2,0} & \text{otherwise.} \end{cases}$$

For this distribution $\theta_{k,m}$ is the estimate associated with the $m^{th}$ level of skill k. Alternate distributions may also be used.

The Evidence Model 115 may be used to specify the mathematical form of the relationship between observable variables and variables describing knowledge, skills and abilities. In one embodiment, a cognitive expert may specify the nature of the relationship among the variables (e.g., compensatory, conjunctive, disjunctive, inhibitor) in the Evidence Model. A measurement expert (or software embodying that expertise) may select an appropriate functional form based on the cognitive expert's specifications.

Figure 13:
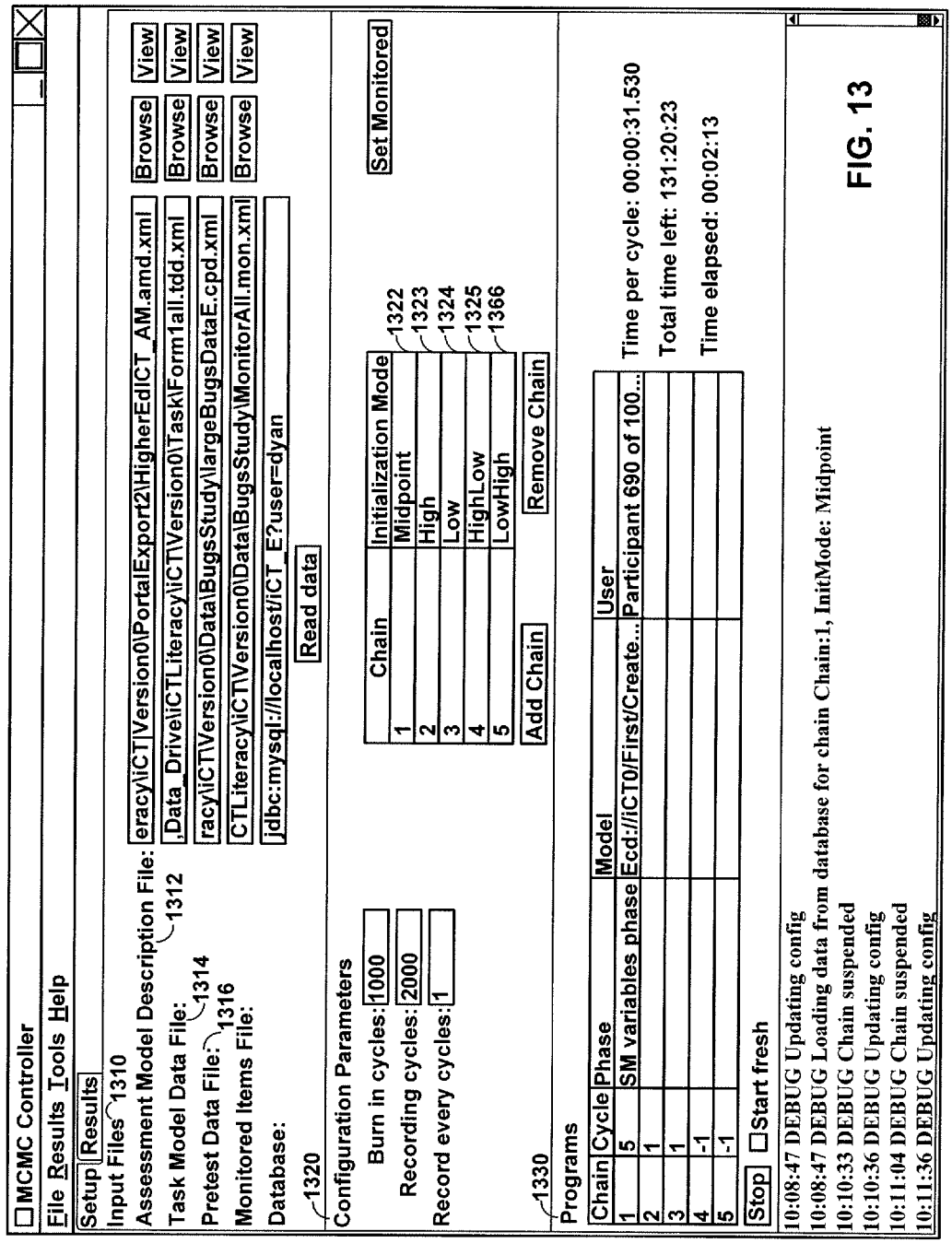
FIG. 13 depicts an exemplary graphical user interface according to a software embodiment.

FIG. 13 depicts an exemplary graphical user interface according to a software embodiment. As shown in FIG. 13, a plurality of information may be used to define a calibration run. The Input Files panel 1310 may describe the inputs used in the calibration process. In an embodiment, the Assessment Model Description File 1312 may contain the ECD design objects used in the calibration process. In an embodiment, the Task Model Data File 1314 may contain tasks, from which Task Models 110, task specifications and task designs are derived, and radical task design variables. In an embodiment, the Pretest Data File 1316 may contain the observed outcomes from a pretest or simulation. In an embodiment, the Configuration Parameters panel 1320 may contain various options that an analyst may use in a MCMC simulation. As shown in FIG. 13, the analyst may run five chains 1322-1326, where each chain starts at one of five different locations. The Progress panel 1330 may depict the progress of the MCMC algorithm and displays status messages. In an embodiment, a results page (not shown) may display statistics for the posterior distributions associated with the Student Model 105 and the Link Models.

The scoring and calibration algorithms described herein may be run "backwards" to generate simulated patterns of observed outcomes to simulate examinees. Such simulation data may be used for purposes such as evaluating the reliability of a proposed design, studying the robustness of a proposed design, validating a software implementation, and/or researching new techniques.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for constructing an assessment, the method comprising:
receiving a response for each of a plurality of tasks from one or more examinees for pretesting the tasks;
wherein the plurality of tasks comprises a plurality of calibrated tasks and a plurality of uncalibrated tasks,
wherein a task model corresponds to each task, wherein each task model comprises parameters relating to characteristics of the corresponding task,
wherein each task model for an uncalibrated task further comprises a plurality of radicals, wherein a radical identifies a task content characteristic of the uncalibrated task that is known to affect difficulty;
generating observables with a processor for each response using an evidence model, the evidence model including a mapping between responses and observable variables and a plurality of parameters describing the mapping;
calibrating one or more student models and each uncalibrated task with the processor based on at least the task model corresponding to the task and the observables obtained from the responses, wherein said calibrating is carried out based on values of the plurality of radicals of the task model;
wherein a student model corresponds to each examinee, and wherein each student model comprises one or more discrete variables each relating to one or more of knowledge, skills and abilities of the corresponding examinee and parameters describing a relationship among the one or more variables; and
constructing an assessment based upon the calibrated one or more student models and based upon the calibrated tasks.

2. The method of claim 1 wherein each task model further comprises a task specification, wherein the task model comprises one or more parameters that are radicals, wherein the task specification comprises each parameter for the task model, wherein the task specification comprises a fixed value for at least one radical.

3. The method of claim 2 wherein each task specification comprises a task design, wherein the task design comprises each parameter for the task specification, wherein the task design comprises a fixed value for each radical.

4. The method of claim 1 wherein a mathematical form of an evidence model is realized using a Bayesian network.

5. The method of claim 1 wherein a mathematical form of a student model is realized using a Bayesian network.

6. The method of claim 1 wherein calibrating each uncalibrated task comprises performing a Markov Chain Monte Carlo algorithm to determine an estimate for parameters of the specified model.

7. A system for estimating uncalibrated task performance, the system comprising:
a processor;
a processor-readable storage medium;
wherein the processor-readable storage medium contains one or more programming instructions for estimating uncalibrated task performance, the processing instructions, when executed, causing the processor to execute steps comprising:
receiving a response for each of a plurality of tasks from one or more examinees for pretesting the tasks,
wherein the plurality of tasks comprises a plurality of calibrated tasks and a plurality of uncalibrated tasks,
wherein a task model corresponds to each task, wherein each task model comprises parameters relating to characteristics of the corresponding task,
wherein each task model for an uncalibrated task further comprises a plurality of radicals, wherein a radical identifies a task content characteristic of the uncalibrated task that is known to affect difficulty;

generating observables for each response using an evidence model, the evidence model including a mapping between responses and observable variables and a plurality of parameters describing the mapping;

calibrating one or more student models and each uncalibrated task based on at least the task model corresponding to the task and the observables obtained from the responses, wherein said calibrating is carried out based on values of the plurality of radicals of the task model;

wherein a student model corresponds to each examinee, and wherein each student model comprises one or more discrete variables each relating to one or more of knowledge, skills and abilities of the corresponding examinee and parameters describing a relationship among the one or more variables; and constructing an assessment based upon the calibrated one or more student models and based upon the calibrated tasks.

8. The system of claim 7 wherein each task model further comprises a task specification, wherein the task model comprises one or more parameters that are radicals, wherein the task specification comprises each parameter for the task model, wherein the task specification comprises a fixed value for at least one radical.

9. The system of claim 8 wherein each task specification comprises a task design, wherein the task design comprises each parameter for the task specification, wherein the task design comprises a fixed value for each radical.

10. The system of claim 7 wherein a mathematical form of an evidence model is realized using a Bayesian network.

11. The system of claim 7 wherein a mathematical form of a student model is realized using a Bayesian network.

12. The system of claim 7 wherein calibrating each uncalibrated task comprises performing a Markov Chain Monte Carlo algorithm to determine an estimate for parameters of the specified model.

13. The system of claim 7, wherein a plurality of evidence models describe the relationship between observables for each task and the discrete variables of the student model, and wherein the evidence models include parameters describing the relationship.

14. The method of claim 1, wherein a plurality of evidence models describe the relationship between observables for each task and the discrete variables of the student model, and wherein the evidence models include parameters describing the relationship.

15. The system of claim 7, wherein calibrating one or more student models and each uncalibrated task comprises carrying out said calibrating based on the calibrated tasks.

16. The method of claim 1, wherein calibrating one or more student models and each uncalibrated task comprises carrying out said calibrating based on the calibrated tasks.

17. The method of claim 1, further comprising:
providing a plurality of tasks to one or more examinees for pretesting the tasks.

18. The method of claim 7, wherein the processing instructions, when executed, causing the processor to execute steps comprising:
providing a plurality of tasks to one or more examinees for pretesting the tasks.

* * * * *